US009074868B2

(12) United States Patent
Bendall et al.

(10) Patent No.: US 9,074,868 B2
(45) Date of Patent: Jul. 7, 2015

(54) AUTOMATED BORESCOPE MEASUREMENT TIP ACCURACY TEST

(71) Applicant: General Electric Company, Schenectady, NY (US)

(72) Inventors: Clark Alexander Bendall, Syracuse, NY (US); Joshua Lynn Scott, Jordan, NY (US)

(73) Assignee: General Electric Company, Schenectady, NY (US)

( * ) Notice: Subject to any disclaimer, the term of this patent is extended or adjusted under 35 U.S.C. 154(b) by 117 days.

(21) Appl. No.: 13/892,794

(22) Filed: May 13, 2013

(65) Prior Publication Data
US 2014/0333778 A1 Nov. 13, 2014

(51) Int. Cl.
*G01B 11/00* (2006.01)
*G01B 21/04* (2006.01)

(52) U.S. Cl.
CPC ............ *G01B 11/002* (2013.01); *G01B 21/042* (2013.01)

(58) Field of Classification Search
USPC .......................... 356/600–626, 512, 445, 447; 250/237 G; 345/419
See application file for complete search history.

(56) References Cited

U.S. PATENT DOCUMENTS

| 4,493,105 | A * | 1/1985 | Beall et al. ................... 382/197 |
| 7,372,558 | B2 * | 5/2008 | Kaufman et al. ........... 356/237.2 |
| 7,821,649 | B2 | 10/2010 | Bendall et al. |
| 7,899,598 | B2 * | 3/2011 | Woon et al. ..................... 701/50 |
| 8,107,083 | B2 | 1/2012 | Bendall et al. |
| 8,300,920 | B2 * | 10/2012 | Chang et al. .................. 382/141 |
| 8,760,447 | B2 * | 6/2014 | Bendall et al. ................ 345/419 |
| 2009/0225321 | A1 * | 9/2009 | Bendall et al. ................ 356/447 |
| 2009/0225329 | A1 * | 9/2009 | Bendall et al. ................ 356/610 |
| 2009/0225333 | A1 * | 9/2009 | Bendall et al. ................ 356/626 |
| 2011/0205552 | A1 | 8/2011 | Bendall et al. |
| 2012/0256901 | A1 * | 10/2012 | Bendall ......................... 345/419 |
| 2012/0314058 | A1 * | 12/2012 | Bendall et al. ................ 348/135 |

* cited by examiner

*Primary Examiner* — Sang Nguyen
(74) *Attorney, Agent, or Firm* — Barclay Damon LLP

(57) ABSTRACT

Measurement accuracy of a remote visual inspection (RVI) system is tested using a test object including a test feature having a known geometric characteristic. Using a controller, attachment of a detachable measurement optical tip to an RVI probe is detected. A user is then prompted to perform testing of the measurement accuracy. When the user indicates the test feature is visible, the system captures one or more images of the test feature, determines coordinates of the test feature from the images, and measures a geometric characteristic of the test feature using the coordinates. An accuracy result is determined using the measured geometric characteristic and the known geometric characteristic, and an indication is provided, e.g., to the user, of the result of the comparison. An RVI system with a user-prompt device is also described.

20 Claims, 8 Drawing Sheets

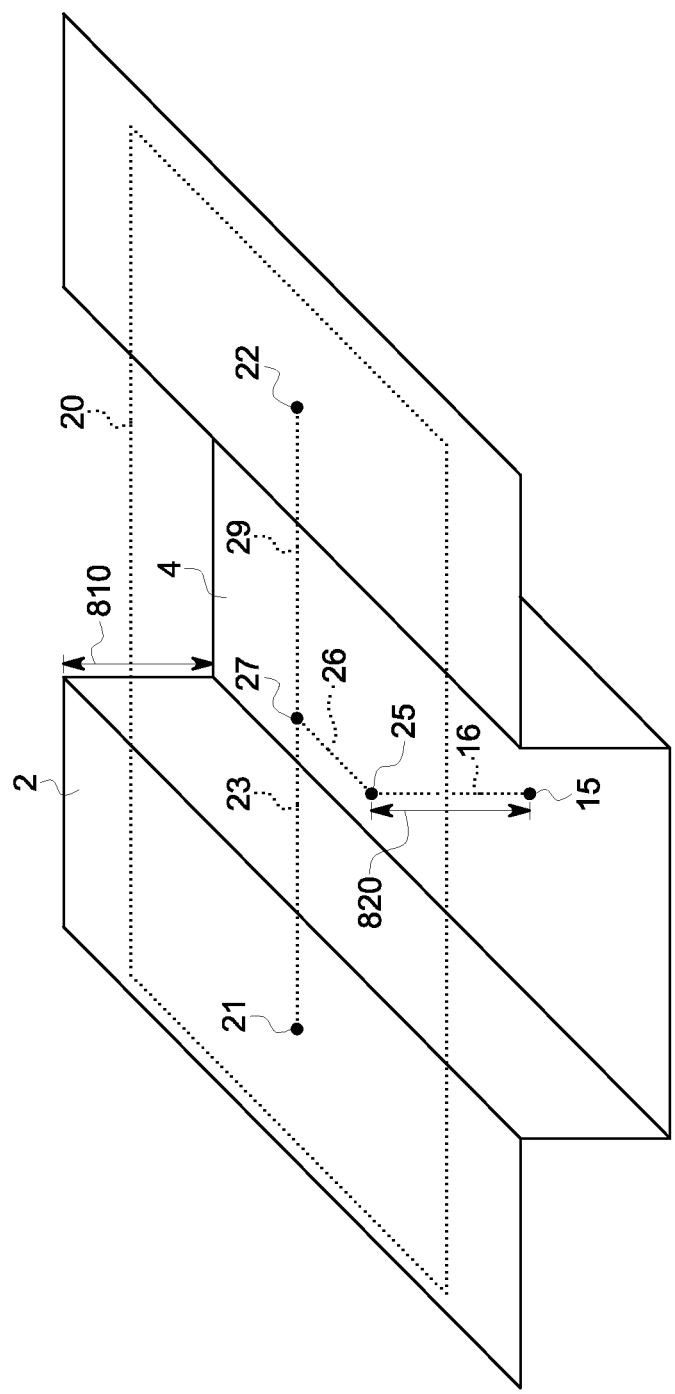

AUTOMATED BORESCOPE MEASUREMENT TIP ACCURACY TEST

BACKGROUND OF THE INVENTION

The subject matter disclosed herein relates to visual inspection systems, and more specifically to ways of evaluating the performance of such systems.

Remote visual inspection (RVI) systems, e.g., borescopes, permit viewing features that are not directly accessible by human inspectors, such as turbine blades. RVI systems also permit visual inspection in areas that are hazardous to humans, such as toxic or very hot atmospheres. RVI systems generally have detachable tips. An inspector selects an appropriate tip for each inspection. Some tips permit not just capturing images of objects being inspected, but also capturing three-dimensional data of the shape of those objects. For example, phase-measurement tips project structured light patterns, e.g., parallel lines, onto inspection targets. Images of the targets are then captured. The phases of the structured light patterns as reflected off the targets depend on the distances between the pattern projectors and the targets. In various examples, differences between the absolute phases of the two separately-projected fringe sets are used to determine object distance.

However, the repeated attaching and detaching of tips, in addition to the environmental conditions in which they operate, can degrade or shift the performance of tips over time. For example, some tips include light sources. Those light sources can become caked with dust or other contaminants, reducing the light output. For tips using generally uniform illumination, such as phase-measurement tips, differential brightness reduction can reduce the accuracy with which 3-D data are measured.

Prior systems use a test block to perform verification of magnification on image-capturing tips. For tips used for 3-D measurements, test blocks can also be used to verify triangulation geometry. The test block includes a visible feature with a known size, and fixture to hold the tip in place with respect to the feature. To check magnification, a user inserts the tip into the test block and captures an image of the feature. The user then uses the normal measurement functions of the RVI system to measure the size of the feature. This generally includes manually positioning crosshairs, pointers, or other locators over portions of the feature, entering data about the tip and the test block into the RVI system, receiving a measurement between the crosshairs from the RVI system, and comparing that measurement to a known value. Although this type of verification can be useful, it is limited to simple dimensional measurement and is not suitable for more advanced tips such as phase measurement tips that can be used to take 3-D measurements.

The discussion above is merely provided for general background information and is not intended to be used as an aid in determining the scope of the claimed subject matter.

BRIEF DESCRIPTION OF THE INVENTION

Moreover, a problem the prior art fails to recognize is that gradual changes over time are generally difficult for humans to perceive. A human inspector viewing images from a 3-D measurement tip with differentially-obscured light sources may not realize that the 3-D data are not as accurate as desired. Although some stereo-measurement-capable RVI systems include tests to determine the accuracy of stereo data, these tests are only performed at the request of an inspector. Accordingly, there is a need for a way to automatically determine whether the performance of a tip is impaired and, if so, to alert the user of the RVI system.

Accordingly, measurement accuracy of a remote visual inspection (RVI) system is tested using a test object including a test feature having a known geometric characteristic. Using a controller, attachment of a detachable measurement optical tip to an RVI probe is detected. A user is then prompted to perform testing of the measurement accuracy. When the user indicates the test feature is visible, the system captures one or more images of the test feature, determines coordinates of the test feature from the images, and measures a geometric characteristic of the test feature using the coordinates. An accuracy result is determined using the measured geometric characteristic and the known geometric characteristic, and an indication is provided, e.g., to the user, of the result of the comparison.

An advantage that may be realized in the practice of some disclosed embodiments of the method is that the data are checked for accuracy automatically, without requiring a user to position crosshairs or take other manual steps after the test feature is in position in the field of view of the tip. The user is prompted to perform verification, advantageously reducing the probability of gradual changes going undetected. Various embodiments can provide verification of tips that permit measuring data beyond image capture such as 3-D phase-measurement tips.

In an embodiment, a method of testing measurement accuracy of a remote visual inspection system is disclosed. The testing is performed using a test object including a test feature having a known geometric characteristic. The method comprises automatically performing, using a controller, the steps of detecting attachment of a detachable measurement optical tip to a probe of the remote visual inspection system, after detecting attachment of the detachable measurement optical tip, prompting a user via a user-prompt device to perform testing of the measurement accuracy of the remote visual inspection system, capturing one or more images of the test feature on the test object, determining coordinates of the test feature using at least some of the captured images, determining a measured geometric characteristic of the test feature using the determined coordinates of the test feature, determining an accuracy result using the measured geometric characteristic and the known geometric characteristic, and providing an indication of the determined accuracy result.

In another embodiment, a remote visual inspection system is disclosed. The system includes a probe adapted to receive a detachable measurement optical tip, the probe including an image sensor adapted to view a target through the detachable measurement optical tip and capture one or more image(s) of the target, a user-prompt device, a detection circuit adapted to detect attachment of the detachable measurement optical tip to the probe, and a controller responsive to detection of an attachment by the detection circuit to prompt a user via the user-prompt device to place a test object in a selected orientation with respect to the image sensor, the test object including a test feature having a known geometric characteristic, operate the image sensor to capture one or more images of the test feature, determine coordinates of the test feature using at least some of the captured images, determine a measured geometric characteristic of the test feature using the determined coordinates of the test feature, determine an accuracy result using the measured geometric characteristic and the known geometric characteristic, and provide an indication of the determined accuracy result.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 8B is a perspective showing a cross-section of an exemplary test feature;

DETAILED DESCRIPTION OF THE INVENTION

In the following description, some embodiments will be described in terms that would ordinarily be implemented as software programs. Those skilled in the art will readily recognize that the equivalent of such software can also be constructed in hardware (hard-wired or programmable), firmware, or micro-code. Accordingly, embodiments of the present invention may take the form of an entirely hardware embodiment, an entirely software embodiment (including firmware, resident software, or micro-code), or an embodiment combining software and hardware aspects. Software, hardware, and combinations can all generally be referred to herein as a "service," "circuit," "circuitry," "module," or "system." Various aspects can be embodied as systems, methods, or computer program products. Because data manipulation algorithms and systems are well known, the present description will be directed in particular to algorithms and systems forming part of, or cooperating more directly with, systems and methods described herein. Other aspects of such algorithms and systems, and hardware or software for producing and otherwise processing signals or data involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Figure 1:
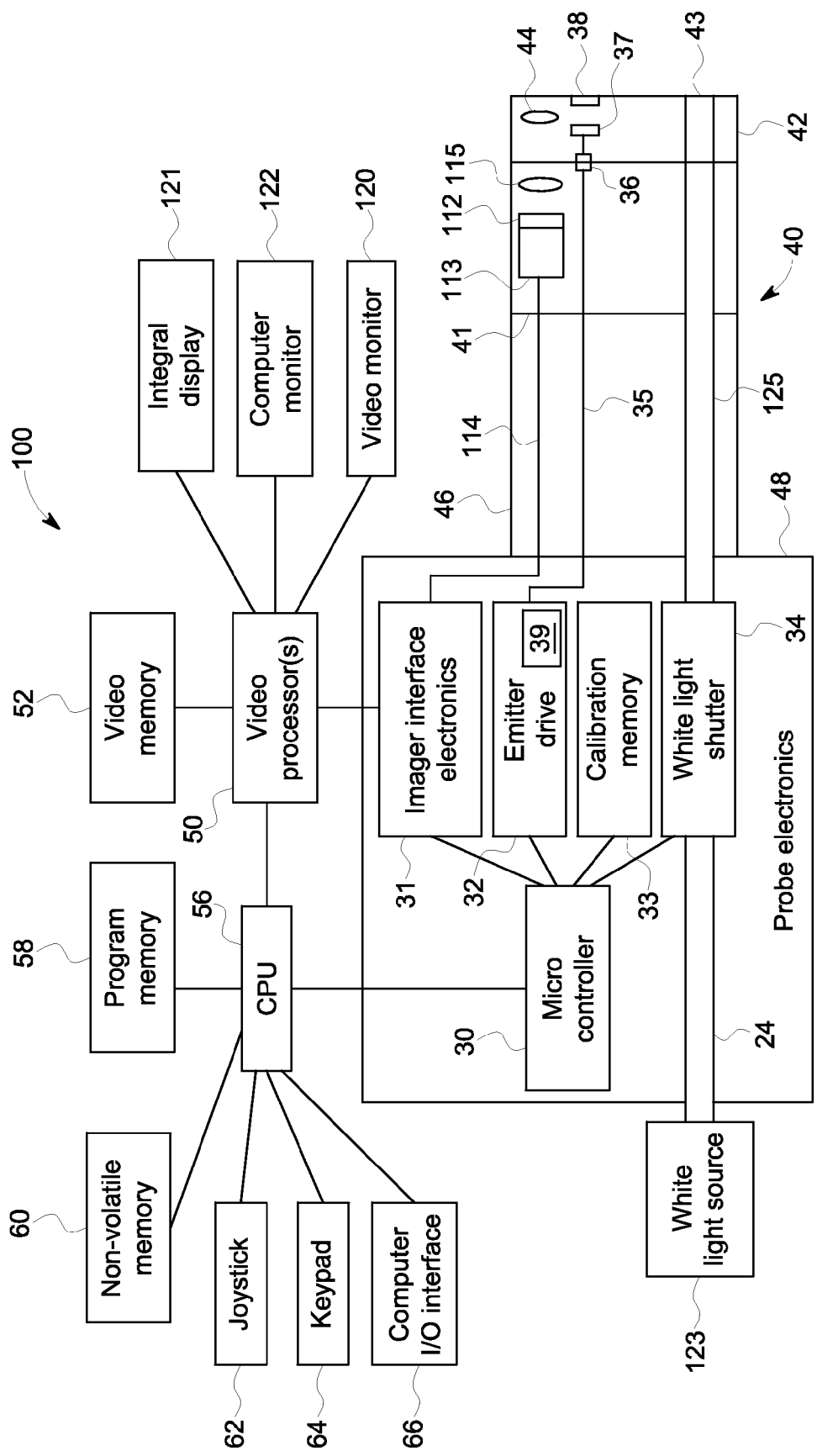
FIG. 1 is a schematic diagram of an exemplary remote visual inspection system.

FIG. 1 is a schematic diagram of an exemplary remote visual inspection system. Further details of this system are described in U.S. Publication No. 2011/0205552. Illustrated in FIG. 1, an exemplary borescope/endoscope probe or system 100 is shown. An insertion tube 40 comprises elongated portion 46 and detachable distal tip 42. Elongated portion 46 comprises a main long, flexible portion, a bending neck, and a camera head. Delineation line 41 shows where the camera head starts on elongated portion 46. The camera head of elongated portion 46 typically includes at least image sensor 112, electronics 113, and probe optics 115. Detachable distal tip 42 typically attaches to the camera head of elongated portion 46, mentioned above. Detachable distal tip 42 contains viewing optics 44 which are used in combination with probe optics 115 to guide and focus light received from the surface or object (not shown) onto image sensor 112. The viewing optics 44 may optionally include relay optics such as a lens or fiber optic system to remote the camera head away from the distal tip 42. Herein, the terms "imager" and "image sensor" are interchangeable.

Image sensor 112 may comprise, for example, a two-dimensional array of light-sensitive pixels that outputs a video signal in response to the light level sensed at each pixel. Image sensor 112 may comprise a charge-coupled device (CCD), complementary metal-oxide-semiconductor (CMOS) image sensor, or other devices of similar function. The video signal is buffered by electronics 113 and transferred to imager interface electronics 31 via signal line 114. Imager interface electronics 31 may include, for example, power supplies, a timing generator for generating image sensor clock signals, an analog front end for digitizing the image sensor video output signal, and a digital signal processor for processing the digitized image sensor video data into a more useful format for video processor 50.

Video processor 50 performs various functions not limited to image capture, image enhancement, graphical overly merging, and video format conversion and stores information relating to those functions in video memory 52. Video processor 50 may comprise field-programmable gate array (FPGA), digital signal processor (DSP), or other processing elements and provides information to and receives information from central processing unit (CPU) 56. The provided and received information may relate to commands, status information, video, still images, or graphical overlays. Video processor 50 also outputs signals to various monitors such as computer monitor 122, video monitor 120, and integral display 121. Examples of components of or connected to video processor 50 are described below with reference to FIG. 4.

When connected, each of computer monitor 122, video monitor 120, or integral display 121 typically display images of the object or surface under inspection, menus, cursors, and measurement results. Computer monitor 122 is typically an external computer type monitor. Similarly, video monitor 120 typically includes an external video monitor. Integral display 121 is integrated and built into probe or system 100 and typically comprises a liquid crystal display (LCD).

CPU 56 can use both program memory 58 and non-volatile memory 60, which may include removable storage devices. CPU 56 may also use volatile memory such as RAM for program execution and temporary storage. A keypad 64 and joystick 62 convey user input to CPU 56 for such functions as menu selection, cursor movement, slider adjustment, and articulation control. Computer I/O interface 66 provides various computer interfaces to CPU 56 such as USB, FIREWIRE, Ethernet, audio I/O, and wireless transceivers. Additional user I/O devices such as a keyboard or mouse may be connected to computer I/O interface 66 to provide user control. CPU 56 generates graphical overlay data for display, provides recall functions and system control, and provides image, video, and audio storage. Examples of components of or connected to CPU 56 are described below with reference to FIG. 4. In various embodiments, CPU 56 is configured to perform phase-shift or shadow analysis and measurement processing.

Probe or system 100 further comprises contacts 36 that electrically couple elongated portion 46 to distal tip 42 through the camera head. Contacts 36 may be spring loaded and also provide electrical power from drive conductor 35 to light emitter module 37, which comprises a plurality of light emitters. Drive conductor 35 carries power from emitter drive 32 to the plurality of light emitters disposed in parallel on the distal end of insertion tube 40. Drive conductor 35 comprises one or more wires and may be incorporated with signal line 114 in a common outer jacket (not shown). Drive conductor 35 may also share conductors with signal line 114 or utilize the insertion tube 40 structure for carrying current. Emitter drive 32 includes, for example, an adjustable current source with a variable on time to compensate for light emitters with differing power capabilities and efficiencies. Emitter drive 32 also comprises brightness or fringe contrast determining function 39. Alternatively, video processor 50, discussed above, may include fringe contrast determining function 39.

The at least one light emitter module 37 on distal tip 42 can include a plurality of light emitters and optionally other electronics for control/sequencing of light emitters, sensing temperature, and storage/retrieval of calibration data. The at least one light emitter module 37 may include a heat sink made of a ceramic or metal, for example, to reduce the temperature rise of the plurality of light emitters. In various embodiments, light from a plurality of light emitters disposed on distal tip 42 is passed through at least one intensity modulating element 38 to alter the distribution of light and project at least one structured-light pattern on the surface suitable for phase-shift analysis. A fringe set comprises a structured-light pattern projected when one light emitter group of at least one of the plurality of light emitters is emitting light. Light from the plurality of light emitters is passed through the at least one intensity modulating element 38 to project a plurality of fringe sets onto the surface. In other embodiments, some light from one or more light emitter(s) is absorbed or reflected by an object that thereby casts a shadow of a known shape.

In embodiments using phase measurement, the probe operates in measurement mode when the at least one of the plurality of fringe sets is projected onto the surface. During measurement mode, light emitter module 37 is enabled and at least one digital image comprising a structured-light pattern on the surface is captured. Phase-shift analysis is may be performed directly on the at least one captured digital image. It may also be performed on data derived from the at least one captured digital image. For example, a luminance component derived from an YCrCb, RGB, or any other captured image format can be used. Thus, any reference to performing phase-shift analysis on an image made herein would include performing phase-shift analysis on the actual referenced image or on any data derived from the referenced image.

In embodiments using phase measurement, or in other embodiments, the probe operates in inspection mode when the at least one structured-light pattern is absent. During inspection mode, inspection light source 123 is enabled and outputs light from the distal end of insertion tube 40. The elements that produce and deliver light during inspection mode may collectively be referred to as an inspection light delivery system. In one embodiment, the inspection light delivery system comprises inspection light source 123, source fiber bundle 24, shutter mechanism 34, probe fiber bundle 125, and light passing element 43. In other embodiments, the inspection light delivery system may comprise very different elements such as, in the case of distally-located white LEDs, an LED drive circuit that can be disabled or provides an adjustable output current, wires for delivering power to the LEDs, the LEDs themselves, and a protective element to protect the LEDs. During measurement mode, the intensity of light output from the inspection light delivery system is automatically decreased to avoid reducing the contrast of the at least one structured-light pattern, for example.

Inspection light source 123 is typically a white light source, but may comprise any appropriate light source for a probe such as a mercury or metal halide arc lamp, halogen lamp, laser/phosphor system, or LED based light source which can be either proximally or distally located. When a fiber based light source is used, source fiber bundle 24 is included in probe or system 100. Source fiber bundle 24 comprises a non-coherent or semi-coherent fiber optic bundle and transmits light to shutter mechanism 34. Shutter mechanism 34 allows light output from the inspection light delivery system during inspection mode or regular inspection and blocks or otherwise inhibits light output from the inspection light delivery system during measurement mode or measurement pattern projection. Shutter mechanism 34 includes, for example, a solenoid or motor driven mechanical shutter or an electric light source disabler. The location of shutter mechanism 34 can vary based on its implementation. When shutter mechanism 34 allows light to pass, probe fiber bundle 125 delivers light to the surface or inspection site via light passing element 43. Probe fiber bundle 125 can include a non-coherent fiber optic bundle. Light passing element 43 can include a glass cane, formed fibers, or distribution control features such as lenses or a diffuser.

The previously discussed imager interface electronics 31, emitter drive 32, and shutter mechanism 34 are included in the probe electronics 48. Probe electronics 48 may be physically separated from a main control unit or CPU 56 to provide more local control over probe-related operations. Probe electronics 48 further comprise calibration memory 33. Calibration memory 33 stores information relating to the optical system of distal tip 42 or elongated portion 46 such as magnification data, optical distortion data, and pattern projection geometry data.

Microcontroller 30, also included in probe electronics 48, communicates with imager interface electronics 31 to determine and set gain and exposure settings; controls emitter drive 32 circuitry; stores and reads calibration data from the calibration memory 33; controls shutter mechanism 34; and communicates with CPU 56. Examples of components of or connected to microcontroller 30 are discussed below with reference to FIG. 4.

Referring back to distal tip 42, the elements shown in distal tip 42 can alternatively be located on elongated portion 46.

These elements include viewing optics 44, at least one light emitter module 37, at least one intensity modulating element 38, and light passing element 43, discussed above. In addition, the at least one light emitter module 37 comprising a plurality of light emitters can be fixedly attached to insertion tube 40 while the at least one intensity-modulating element 38 is disposed on distal tip 42. In such embodiments, precise and repeatable alignment between distal tip 42 and elongated portion 46 is required, permits realizing the advantage of permitting different fields of view while eliminating the need for contacts between elongated portion 46 and distal tip 42.

Mentioned above, in phase-measurement embodiments, a structured-light pattern is created on the surface by passing light through at least one intensity-modulating element 38, which alters the distribution of light. The structured-light pattern can comprise parallel light and dark lines comprising sinusoidal intensity profiles. Line patterns having square, trapezoidal, triangular, or other profiles may be projected on the surface as well when used with appropriate phase-shift analysis to determine phase of the pattern. The pattern may also comprise other than straight, parallel lines. For example, curved lines, wavy lines, zigzagging lines, or other such patterns may be used with appropriate analysis.

Figure 6:
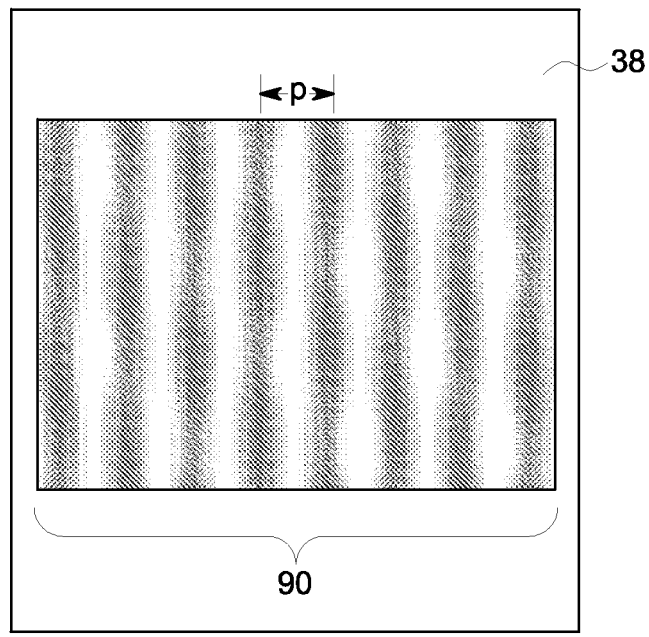
FIG. 6 is a top view of an exemplary intensity modulating element including a line grating.

In one phase-measurement embodiment, the at least one intensity modulating element 38 comprises a line grating 90, shown in FIG. 6. In addition, the at least one light emitter module comprises a plurality of light emitters. Particularly, the at least one light emitter module comprises LEDs or an LED array.

In various phase-measurement embodiments, a fringe set comprises a structured-light pattern projected when one light emitter group of at least one of the plurality of light emitters is emitting light. The plurality of light emitters of light emitter module 37 are positioned such that the structured-light pattern projected when one group of at least one light emitter is emitting exhibits a spatial or phase-shift relative to the structured-light patterns projected when other groups of at least one light emitter are emitting. In other words, the structured-light pattern of one fringe set exhibits a spatial or phase-shift relative to the structured-light patterns of other fringe sets.

Figure 2:
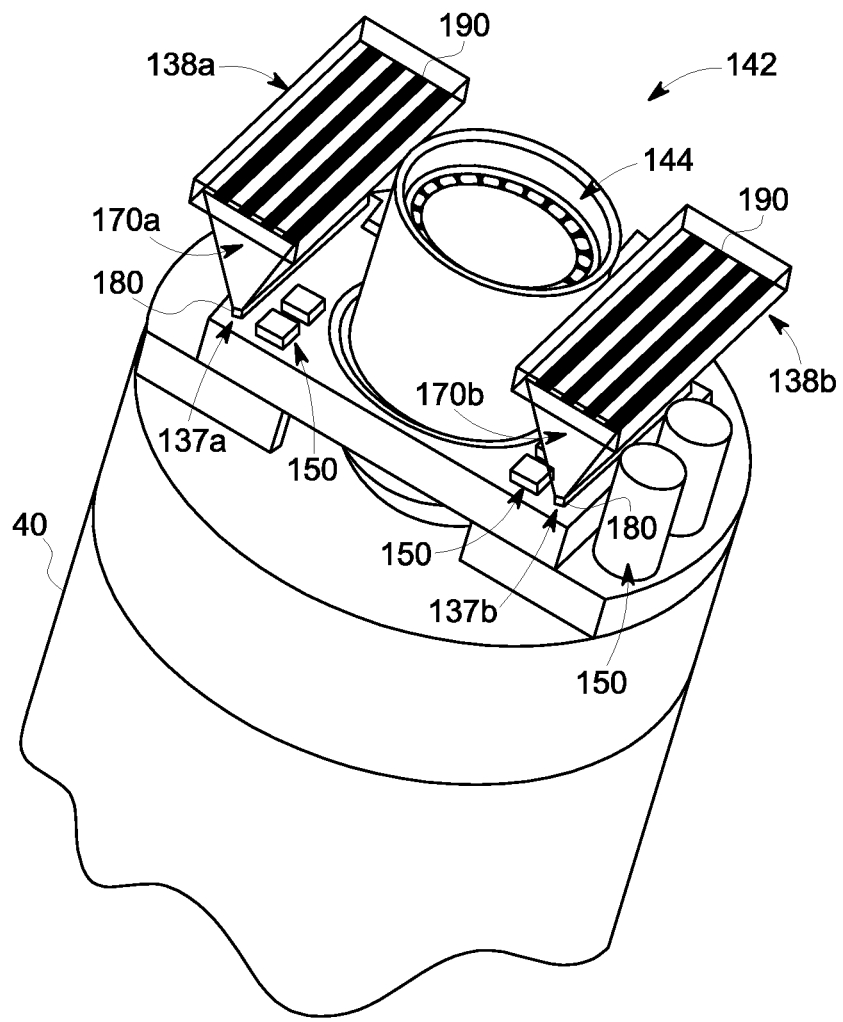
FIG. 2 is a perspective of components of a detachable tip for a remote visual inspection system according to an exemplary embodiment.

FIG. 2 is a perspective of components of a detachable tip 142 for a remote visual inspection system, e.g., a distal tip 42 (FIG. 1), according to an exemplary embodiment. The tip 142 can be attached to insertion tube 40, shown for orientation. The illustrated components of tip 142 can be enclosed in a housing that shields those components from dirt or other contaminants, mechanical damage, or harsh environments. The tip 142 can be used to perform phase measurements using structured-light patterns. Further details of tip 142 are described in the above-referenced U.S. Publication No. 2011/0205552.

Two light emitter modules 137a, 137b comprising a plurality of light emitters are positioned on each side of forward viewing optics 144. The plurality of light emitters positioned on one side of viewing optics 144 comprises first light emitter module 137a, and the plurality of light emitters positioned on the other side of viewing optics 144 comprises second light emitter module 137b. In addition, intensity modulating element 138 comprises two intensity modulating areas 138a and 138b, one intensity modulating area positioned on each side of forward viewing optics 144. Light from first light emitter module 137a is passed via path 170a through intensity modulating area 138a, which forms a first projection set, and light from second emitting module 137b is passed via path 170b through intensity modulating area 138b, which forms a second projection set. Intensity modulating element 138 comprises line grating 190, which alters the distribution of light and creates a structured-light pattern on the surface compatible with phase-shift analysis.

An image sensor (not shown) obtains a first image set and a second image set. The first image set comprises at least one image of a projection onto the surface of at least one of the plurality of fringe sets of the first projection set, and the second image set comprises at least one image of a projection onto the surface of at least one of the plurality of fringe sets of the second projection set.

First light emitter module 137a associated with first intensity modulating area 138a is positioned on one side of viewing optics 144, and second light emitter module 137b associated with second intensity modulating area 138b is positioned on the other side of viewing optics 144 such that the at least one structured-light pattern reflected from the surface passes through viewing optics 144 to reach the image sensor (not shown).

The two light emitter modules 137a, 137b each comprise an elongated LED array 180, which in turn comprises at least three light emitters. Alternatively, the two light emitter modules 137a, 137b may each comprise a plurality of light emitters, each of the plurality of light emitters comprising a series string of at least two LEDs. A light passing element (not shown), which delivers light from an inspection light source 123 (FIG. 1) to the surface may also be included in distal tip 142. Optional circuitry 150 located on distal tip 142 may control sequencing of the LEDs, select between single and multiple LEDs, sense temperature, and store/retrieve calibration data. The optional circuitry 150 can be managed by the CPU 56 or microcontroller 30 shown in FIG. 1.

In probe or system 100, the first projection set comprises a plurality of fringe sets and the second projection set comprises a plurality of fringe sets. The plurality of light emitters are positioned such that the structured-light pattern of one fringe set of the first projection set projected from one light emitter group of the first light emitter module exhibits a phase-shift relative to the structured-light patterns of the other fringe sets of the first projection set projected from the other light emitter groups of the first light emitter module. Similarly, the structured-light pattern of one fringe set of the second projection set projected from one light emitter group of the second light emitter module exhibits a phase-shift relative to the structured-light patterns of the other fringe sets of the second projection set projected from the other light emitter groups of the second light emitter module.

The plurality of light emitters are positioned such that the structured-light pattern of one fringe set of the first projection set exhibits a spatial or phase-shift relative to the structured-light patterns of other fringe sets of the first projection set. Similarly, the structured-light pattern of one fringe set of the second projection set exhibits a spatial or phase-shift relative to the structured-light patterns of other fringe sets of the second projection set.

In one embodiment, the first light emitter module comprises three light emitter groups and the second light emitter module comprises three light emitter groups. Therefore, three fringe sets comprising the first projection set are produced from one side of viewing optics 144 and three fringe sets comprising the second projection set are produced from the other side of viewing optics 144. Therefore, probe or system 100 can project a total of six fringe sets, three fringe sets from each side of the FOV. In order to improve brightness and contrast, light emitter modules 137a and 137b may include more than three LEDs along with a brightness determining function as described in detail above. Furthermore, the plurality of light emitters of light emitter modules 137a and 137b may each include a series string of at least two LEDs.

The accuracy of a system employing structured-light projection and phase-shift analysis is largely determined by its baseline spacing. In the case of a typical system wherein the absolute phase of a fringe set combined with its position in the FOV are used to determine absolute object distance, the baseline spacing is the distance between the projection origin and the camera field of view origin. In this embodiment, wherein the difference between the absolute phases of the two separate fringe sets is used to determine absolute object distance, the baseline spacing is the distance between light emitter modules 137a and 137b. Thus, accuracy is improved when the distance between the two light emitter modules 137a and 137b is larger than the distance between the viewing optics 144 and a single light emitter module 137. As mechanical constraints in small-diameter probes make it difficult to substantially offset the viewing optics 144 from the center of the insertion tube 140, the described embodiment employing two light emitter modules 137a and 137b can generally achieve a larger baseline spacing than could be achieved with a single light emitter module 137 in a forward-viewing system.

In addition, variability in the positioning of the distal tip 142 on the insertion tube causes the projections originating from the tip to shift relative to the FOV. If object distance is computed using absolute phase combined with position in the FOV, this shift causes error in the computed object distance. In this embodiment, such error is eliminated because the absolute phase difference is not affected by positioning of the tip on the insertion tube. In an alternative approach, the two LED arrays may also be located on one side of the viewing optics with a large grating where the first projection set is offset from the viewing optics by slightly more than the second projection set.

In some applications, it is desirable to obtain a view in a direction perpendicular to the probe axis, referred to as a side view. To obtain such a view, distal tip 142 may be replaced with a detachable side-viewing tip 242 (FIGS. 8 and 9) comprising elements such as a side-view prism 210 through which the plurality of fringe sets reflected from the surface pass through viewing optics 244 to reach the image sensor (not shown).

Figure 3:
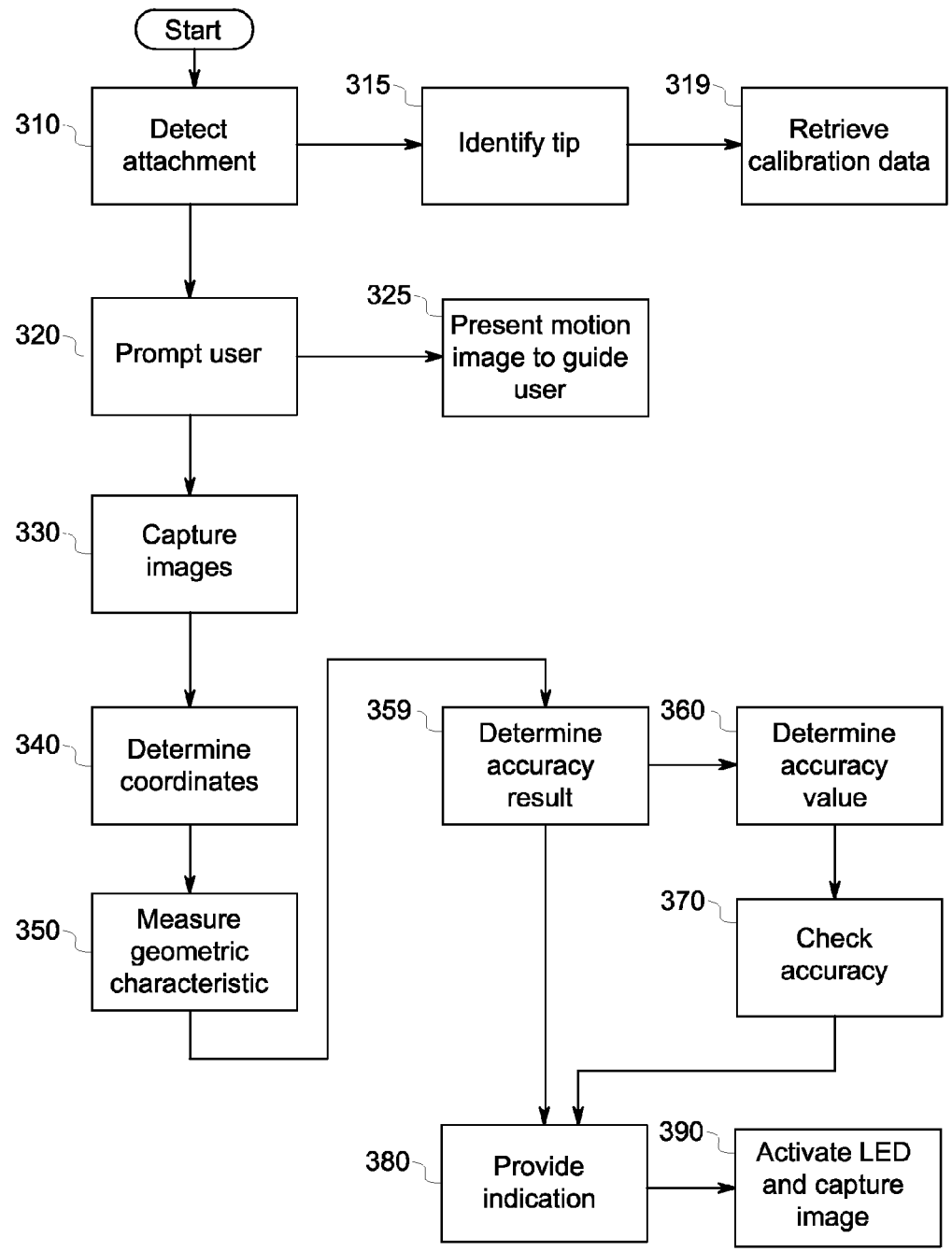
FIG. 3 is a flowchart illustrating exemplary ways of testing measurement accuracy of a remote visual inspection system.

FIG. 3 is a flowchart illustrating exemplary ways of testing measurement accuracy of a remote visual inspection (RVI) system. Briefly, a test object is placed in the field of view of the RVI system. The test object includes a test feature, e.g., a fiducial, having a known geometric characteristic. Images of the test object are captured and a geometric characteristic of the test feature is measured. The measured coordinates are compared to the known geometric characteristic to determine an accuracy value of the RVI system. The steps of this method can be automatically performed using a controller. Processing begins with step 310.

In step 310, attachment of a detachable measurement optical tip to a probe of the remote visual inspection system is detected. The probe can be, e.g., a straight-view or side-view tip. In various embodiments, the controller receives an interrupt on attachment of the detachable measurement optical tip. The controller can also periodically measure an electrical state of a conductor to detect attachment of the detachable measurement optical tip. The controller can detect attachment by monitoring or polling for either level-triggering signals or edge-triggering signals. After attachment of the detachable measurement optical tip is detected, step 310 is followed by step 320. In various embodiments, the probe includes an image sensor (CCD or CMOS). In other embodiments, the detachable measurement optical tip includes an image sensor.

In various embodiments, detecting step 310 includes detecting a change in the resistance of a test circuit when the detachable measurement optical tip is attached. For example, a test voltage can be applied to a detection circuit and a voltage of a test point in the detection circuit can be measured. The detection circuit is configured so that the voltage of the test point is different when the detachable measurement optical tip is attached than when the detachable measurement optical tip is not attached. In an example, the test point is pulled up through a resistor to, e.g., +3.3 VDC when the optical tip is not attached, but when the optical tip is attached it shorts the test point to ground.

In various embodiments, detecting step 310 includes identifying step 315. In step 315, an identity of the attached measurement optical tip is determined. The measurement optical tip can transmit (via wire or wirelessly) identifying information to the controller, or the controller can analyze a resistance value or other electrical property at an interface between the tip and the probe. The identifying information can be used to select measurement calibration data associated with the attached measurement optical tip.

In step 320, a user is prompted via a user-prompt device (e.g., computer monitor 122, FIG. 1) to perform testing of the measurement accuracy of the remote visual inspection system. For example, a "press OK to test" message can be displayed on a screen. Prompting step 320 can include waiting for a test-start indication from a user-input device, e.g., a touch on a touch sensor operatively arranged with respect to the user-prompt device. The touch sensor and user-prompt device can together compose a touchscreen. The user-input device can also be a button, e.g., on a keyboard, joystick, mouse, trackball, or RVI-system chassis or handset.

Figure 4:
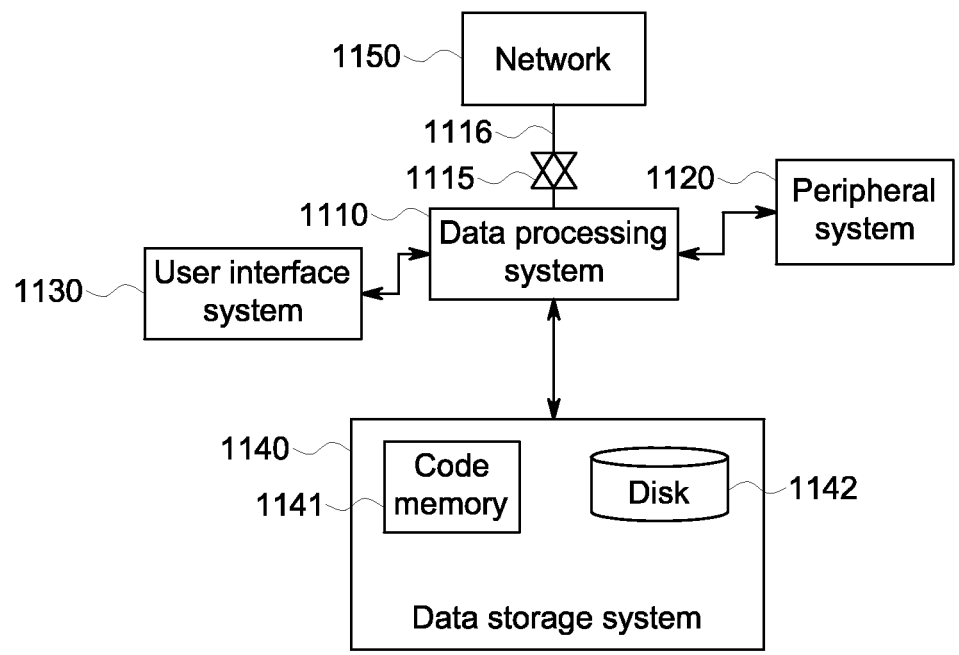
FIG. 4 is a high-level diagram showing an exemplary data-processing system and related components.

In some embodiments, step 320 includes guiding step 325. In guiding step 325, a motion image from an image sensor in the probe is presented on the screen. This can be a live video feed from the image sensor, or successively-presented still captures (e.g., one per second) from the image sensor. Additionally, whether simultaneously or not, a visual representation of an image from an image sensor in a desired orientation with respect to the test feature is presented on the screen. The desired orientation can include a desired relative position (translational displacement of the image sensor from the test feature), relative rotation, or both. The visual representation can be, e.g., an image or thumbnail of an image captured when an image sensor was in the desired orientation with respect to the test feature. The visual representation can be stored in a nonvolatile memory of the RVI system, e.g., data storage system 1140 (FIG. 4).

Figure 10:
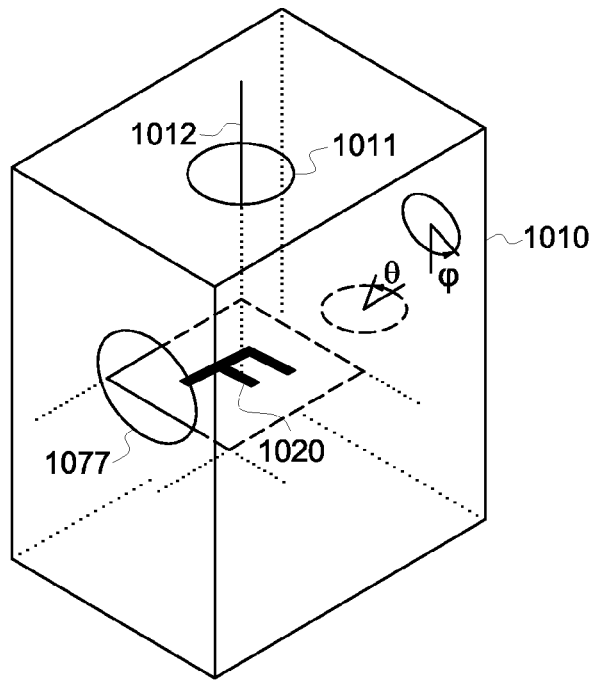
FIG. 10 is a perspective of an exemplary test object.

In some embodiments using step 315, guiding step 325 includes selecting the visual representation using the determined identity. In an example, referring to FIG. 10, the test object is a test block 1010 having the test feature 1020 and two ports 1011, 1077: port 1011 to insert probes carrying straight-view tips, and port 1077 to insert probes carrying side-view tips. Dotted lines are shown for orientation. Line 1012 shows an example of the orientation of a probe carrying a straight-view tip looking down on test feature 1020 (the term "down" is not limiting). As can be seen, a side-view tip in port 1077 can only view test feature 1020 from a limited range of orientations in the plane of test feature 1020 (rotation angle θ near 0°; how near can be selected based on the size of test target 120 and the field of view of the side-view tip). However, a straight-view tip in port 1011 can be turned freely to view test feature 1020 from any θ. Because of the characteristics of the particular tips used, it may be desirable for straight-view tips to view test feature 1020 at an angle θ≠0°. Moreover, some side-view tips flip the image vertically or horizontally.

Therefore, the visual representation that will guide the user in turning a probe carrying a straight-view tip to the correct θ will be different from the visual representation that will guide the user in turning a probe carrying a side-view tip to the correct angle φ (rotation around an axis perpendicular to the θ axis; θ=0° for a side-view tip in this example).

After prompting the user (step 320), in step 330, one or more images of the test feature on the test object are captured. This is done using the image sensor, which captures image data in a way appropriate for the attached measurement optical tip. For example, for stereo, shadow, or laser-dot tips, a single image can be captured. For phase measurement, multiple images can be captured. Step 330 is followed by step 340.

In various embodiments, the detachable measurement optical tip is a structured-light-measurement optical tip having LEDs and gratings, e.g., as discussed below with reference to FIGS. 5-7. On other embodiments, the detachable measurement optical tip is a stereo optical tip or a shadow optical tip. Shadow tips can include, e.g., a slit aperture through which light shines past an opaque line oriented parallel to the aperture. In embodiments using structured light, the detachable measurement optical tip can include a plurality of light-emitting-diodes (LEDs). The tip projects a structured light pattern onto an object in the field of view of the image sensor when the controller activates any of the LEDs. Stereo tips can include a beamsplitter, e.g., a prism, that directs light from two different viewing angles through a lens onto the image sensor. Therefore, the captured image includes two separate captures side by side, one capture from each of the viewing angles. Further examples of stereo tips are described in U.S. Pat. No. 7,170,677 to Bendall et al., incorporated herein by reference. Further examples of shadow tips are given in U.S. Pat. No. 4,980,763 to Lia, incorporated herein by reference.

In various embodiments, step 330 (or step 340) includes analyzing at least one of the captured images to determine an orientation of the test feature with respect to the image sensor. For example, optical and mechanical tolerances, and variations in the way the user positions the tip with respect to the test feature, can cause the test feature to be located at different locations in a captured image frame each time a test sequence (starting with step 310) is performed. The captured images themselves can be analyzed by identifying known features (e.g., orientation marks such as a letter "F") in the image and determining how those features are oriented with respect to the image sensor. This can permit determining whether a straight-view or side-view tip is being used. (In the example above, θ farther from 0 than the permitted range indicates a straight-view tip is in use.) It can also permit making use of captured images at angles different from a selected reference angle. This is useful because users may not always orient the tip at precisely a desired angle before images are captured. When captured images are modified or otherwise processed, subsequent steps use the modified or processed images as the captured images.

In step 340, coordinates of the test feature are determined using at least some of the captured images. This can be done using feature-extraction techniques such as thresholding, high-pass filtering or other edge-detection schemes, region extraction, dialating or eroding image data, or color extraction. Known colors or the known geometric characteristic of the test feature can be sought in the captured image(s) under consideration. Any number ≥1 of coordinates can be determined. The determined coordinates can be two-dimensional (2-D) or three-dimensional (3-D) coordinates. Coordinates can be expressed in Cartesian, polar, spherical, cylindrical, or homogeneous form. 2-D coordinates can be determined by, e.g., inverse projection mapping of the image data to an object plane. 3-D coordinates can be determined using existing techniques such as stereo, scanning systems, stereo triangulation, structured light methods such as phase shift analysis, phase shift moiré, and laser dot projection. Some of these techniques use calibration data that, among other things, includes optical characteristic data that is used to reduce errors in the three-dimensional coordinates that would otherwise be induced by optical distortions. With some techniques, the three-dimensional coordinates may be determined using one or more images captured in close time proximity that may include projected patterns and the like. Step 340 is followed by step 350.

In some embodiments, step 350 is preceded by step 319. In step 319, calibration data corresponding to the attached measurement optical tip is automatically retrieved by the controller. The calibration data can include information relating sizes of images of objects to sizes of those objects, image coordinate frames to object coordinate frames, or brightness to distance. The calibration data can also include information about the tip, such as dimensions of gratings on a structured-light measurement tip. The calibration data can include information relating magnification to distance or information about optical distortion, structured-light projection geometry, or stereo perspective geometry.

In step 350, a geometric characteristic of the test feature is measured using the determined coordinates of the test feature. In an example, the test feature includes two fiducials and the geometric characteristic is the distance between them. This distance can be measured by transforming the determined coordinates of the test feature in image space to physical dimensions (e.g., mm). The Euclidean distance between the physical coordinates can then be computed to determine the distance. In embodiments using step 319, the measuring step is performed using the retrieved calibration data. Step 350 is followed by step 359 or step 360.

The measured geometric characteristic can be a length, width, height, depth, or radius of the test feature. The measured geometric characteristic can also be a deviation of the test feature from a flat plane or other reference surface. The test feature can include a flat surface, a sphere or other raised three-dimensional (3-D) surface, or a slot, circular recess, or other recessed 3-D surface.

In various embodiments, the determined coordinates are three-dimensional (3-D) coordinates. The known geometric characteristic includes 3-D coordinates of a plurality of reference points, and the measured geometric characteristic includes a distance metric between at least some of the determined coordinates and the reference points. In various embodiments, step 350 includes measuring 3-D object coordinates of a plurality of points on the test feature. The 3-D object coordinates are then transformed via a coordinate transform to a coordinate frame of the reference points. For example, structured-light, stereo, and shadow measurement optical tips can be used to capture images the controller can post-process into three-dimensional data. The 3-D object coordinates can be extracted from these data in a frame relative to the probe. They can then be transformed into a frame relative to the reference points, e.g., relative to the test feature.

In various embodiments, the distance metric is a quadratic mean (RMS), sum of squares, mean of squares, or average of respective distances between at least some of the determined coordinates and corresponding ones of the reference points. In an example, let the $i^{th}$ determined coordinate $(x_i, y_i, z_i)$ be represented as a vector $\vec{k}_i = [x_i\, y_i\, z_i]$, and the $i^{th}$ measured point likewise be $\vec{m}_i$, $i \in [1,n]$. The measured geometric characteristic $c_{mg}$ can be the root-mean-square (RMS) expression $$c_{mg} = \sqrt{\frac{1}{n}\sum_{i=1}^{n}\left(\|\vec{m}_i - \vec{k}_i\|^2\right)}.$$

This represents the overall difference between the known points and the measured points with a single value that can be tested in step 370.

In another example, in step 350, one or more value(s) representative of the measured geometric characteristic are provided. In this example, the known geometric characteristic includes one or more value(s) representative of the test feature. In this way, the value(s) representative of the test feature can be used instead of the measured data of the test feature itself. In an example, the test feature is a half-sphere, and two values representative thereof are the maximum widths of the half-sphere along two mutually-perpendicular axes (e.g., axes parallel to θ=0°, θ=90° in FIG. 10). These values should be equal within the manufacturing tolerances of the test feature. The extent to which the values differ beyond those tolerances is therefore an indication of the inaccuracy of the measurement. The two values can be compared to a known value of the width to determine inaccuracies in scale measurement (e.g., both values being about twice as large as the known value indicates a 2× magnification error) and to determine inaccuracies in measurements in one direction compared to measurements in another direction.

In another example, in 3-D, the known geometric characteristic is the flatness of the test feature. The test feature can be designed to be planar, within manufacturing tolerances, and the flatness can be the spacing between two parallel planes between which the test feature lies. The measured geometric characteristic is the corresponding spacing for the measured coordinates, and can be determined by, e.g., fitting a plane to the measured points and determining the distance along the normal to the plane between the two points farthest from the plane in the direction of that normal. The fitting can be done by least-squares or minimax optimization, or other mathematical optimization techniques.

In various embodiments, the known geometric characteristic is a plurality of regions and corresponding flatnesses. For example, the requirements for flatness of measured data of a known-flat surface can be more stringent at the center of the field of view than at an edge. Other known geometric characteristics described herein can also vary from center to edge, or from point to point or area to area of a captured image or of the test object itself. The known geometric characteristic can correspond to manufacturing tolerances of the test object.

In step 359, an accuracy result is determined using the measured geometric characteristic and the known geometric characteristic. This can be done, e.g., as described below with reference to step 360. The accuracy result is correlated with the measurement accuracy of the remote visual inspection system. In an example, determining-accuracy-result step 359 includes computing the accuracy result as a difference between the measured geometric characteristic from step 350 and the known geometric characteristic of the test feature. Step 359 can be followed by step 380 or step 360.

In step 360, in various embodiments, an accuracy value is determined based on the difference between the measured geometric characteristic and the known geometric characteristic of the test feature. This accuracy value is provided using the measurements taken in step 350, which can themselves be computations based on captured image data. Continuing the fiducial-distance example above, the accuracy value can be the result of subtracting or dividing the known distance between the fiducials (e.g., 3 mm) and the measured distance between the fiducials (e.g., 3.14 mm), in either order. The accuracy value can be expressed in physical units, image-sensor units, percentages, standard deviations, or other appropriate measurement bases. Step 360 is followed by step 370.

In step 370, the determined accuracy value is compared to a predetermined acceptable accuracy value. For example, the determined accuracy value can be the ratio of measured characteristic to known characteristic and the predetermined acceptable accuracy value can be a percentage band, e.g., 100±20%. The determined accuracy value a can be the difference |measured-known|, as described above, and the predetermined acceptable accuracy value can be a difference threshold k such that a≤k (i.e., the computed difference(s) are less than the predetermined acceptable accuracy value) or 0≤a≤k. Continuing the distance-metric example above, the known geometric characteristic $c_{mg}$ takes into account the reference points and the measured points, so the $c_{mg}$ value does not need to be compared to a separate known value. Therefore, the comparison of determined accuracy value $c_{mg}$ to the predetermined acceptable accuracy value k can thus include determining whether 0≤$c_{mg}$≤k. A result of the comparison is provided as the accuracy result (discussed above with reference to step 359). Step 370 is followed by step 380.

In examples given above using value(s) representative of the geometric characteristics, step 360 includes computing difference(s) between the one or more value(s) representative of the measured geometric characteristic and the one or more value(s) of the known geometric characteristic. If more than one value is used, the difference can be a single difference computed from a plurality of (measured-value, known-value) pairs, or a plurality of differences between respective (measured-value, known-value) pairs. Step 370 can then include determining whether the computed difference(s) are within a selected percentage or dimensional amount of the predetermined acceptable accuracy value (e.g., a difference of 0±5%, or 0+5%−0%).

In step 380, an indication is provided of the determined accuracy result, e.g., of the difference described above (step 359) or of a result of the comparison described above (step 370). For example, the indication can be a flag set or cleared in a memory operatively connected to the controller. The indication can also be a signal produced or not produced, or produced at a particular value or level, according to the result of the comparison. The indication can also be a visual, auditory, tactile, haptic, olfactory, or gustatory stimulus presented to the user, e.g., via a user-output device (e.g., computer monitor 122, FIG. 1). An example, using the user-prompt device as the user-output device, is a message displayed on the screen that either "measurement is within specification" or "measurement is not within specification." In some embodiments, the indication is provided only on success (determined accuracy is within acceptable accuracy limits) or failure. Specifically, in some embodiments, the indication is presented only if comparing step 370 determines the measured accuracy value does not provide at least the predetermined acceptable accuracy. In some embodiments, step 370 or step 380 is followed by step 390.

In various embodiments, in step 390, after comparing step 370, the controller automatically activates at least one LED on the measurement optical tip at a selected drive current and captures an image using the image sensor. In some of these embodiments, capturing step 330 includes passing a selected test current through the at least one of the LEDs on the measurement optical tip. The selected test current is greater than the selected drive current. This can provide improved signal-to-noise ratio for images captured to test measurement accuracy without accelerating the burnout of the LEDs during normal operation.

In various examples, an identity of the attached measurement optical tip is determined, e.g., as discussed above with reference to step 315. The determined identity and the determined accuracy result are stored, e.g., in a database, file, or other data store. Detecting-attachment step 310, user-prompting step 320, image-capturing step 330, coordinate-determining step 340, characteristic-determining step 350, accuracy-result-determining step 359, identity-determining step 315, and the storing step are then repeated one or more times. This builds up a history in the data store of the tips that have been used, e.g., with a particular remote visual inspection system. The history can then be presented to a user. Trends can also be determined, and deviations from those trends presented to a user. This can permit, e.g., providing the user an indication that a tip may be approaching a point at which it will require maintenance. Using the data store, the characteristics of one or more tips can be tracked for diagnostic or prognostic purposes. In various aspects, the storing step (not shown) includes storing a determined serial number or other identity value of the tip, the date on which measurements were taken (e.g., in step 330), measured values such as the determined geometric characteristic, or the determined accuracy result (e.g., from step 359) or accuracy value (e.g., from step 360). The data store can be internal, e.g., on an internal Flash memory, or external, e.g., on a USB drive or SD card. Data can be imported to or exported from the data store, e.g., via a network or USB connection. Data from the same tip used on different borescopes can be combined to determine whether the tip or the borescope may need repair.

Figure 5:
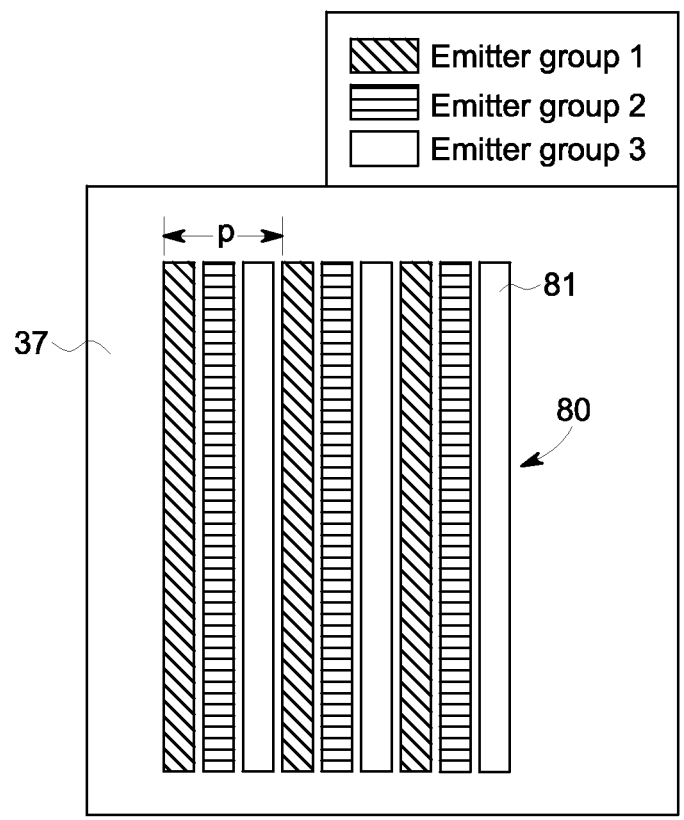
FIG. 5 is top view of an exemplary light-emitting diode (LED) array on a light emitter module made using elongated die.

FIG. 5 is top view of an exemplary light-emitting diode (LED) array on a light emitter module made using elongated die. This array can be used, e.g., for performing phase measurements. Further details of this array are described in the above-referenced U.S. Publication No. 2011/0205552. Line grating 90 (FIG. 6) has a grating period p. Each light emitter 81 has a width less than ⅓ of the grating period p, and each light emitter 81 is lined up adjacent to each other with a center-to-center spacing of p/3. In this configuration, the line pattern projected when one light emitter 81 is emitting has a spatial or phase-shift of approximately ⅓ of the line period or 120° relative to the line pattern projected when the adjacent light emitter 81 is emitting. Exemplary emitting area dimensions for each light emitter 81 used with an 8 cycle/mm grating period p may be 35 μm×500 μm.

Alternatively, an effective phase-shift of 120° can be achieved with configurations in which the light emitter 81 spacing is other than ⅓ of the grating period. For example, with a light emitter 81 spacing of ⅔ of the grating period, the light pattern projected when one light emitter 81 is emitting may have a phase-shift of 240° relative to the line pattern projected when the adjacent light emitter 81 is emitting. In this configuration, each light emitter 81 has width less than ⅔ of the grating period p, and each light emitter 81 is lined up adjacent to each other with a center-to-center spacing of 2p/3. Because multiple lines are projected each having a 0 to 360° phase range, the 240° phase-shift is equivalent to a 120° phase-shift. To generalize, by positioning light emitters 81 with a center-to-center spacing of approximately p/3 of the grating period where p is an integer that is not a multiple of 3, the light pattern projected when one light emitter 81 is emitting may have an effective phase-shift of approximately 120° relative to the line pattern projected when the adjacent light emitter 81 is emitting.

Multiple light emitters 81 are spaced apart by one grating period to create three separate light emitter groups. For clarification only, the light emitters 81 that comprise each of the three light emitter groups in FIG. 2 are indicated with a different pattern. LED array 80 comprises individual light emitters 81 of the same color. However, the color of light emitters 81 comprising one light emitter group can differ from the color of the light emitters 81 comprising other light emitter groups.

A plurality of light emitters 81 comprising each light emitter group are spaced apart along the axis perpendicular to the light emitters 81 and to the lines on the line grating by a distance approximately equal to an integer number of periods of the line grating. As a result, when the plurality of light emitters 81 comprising one light emitter group are simultaneously emitting light, the structured-light patterns produced by each of the multiple light emitters 81 sum together. This forms a brighter line pattern than would be generated by a single light emitter element. Increasing the light emitter width can increase brightness, but the line grating period must increase proportionally causing proportionally higher sensitivity to image noise. By using a plurality of narrow light emitters 81 as described, the pattern brightness can be increased without increasing the line grating period.

Referring to FIG. 5 and also to FIG. 1, emitter drive 32 comprises a brightness or fringe contrast determining function 39 to determine whether one light emitter 81 or multiple light emitters 81 should be enabled for each light emitter group. Because the light from the light emitters 81 is not collimated, the projected fringe sets expand as distance from the line grating increases. When multiple light emitters 81 of a light emitter group are simultaneously emitting, the individual fringe sets are offset by a constant distance (one grating period p as shown in the exemplary cases of FIGS. 5 and 6) rather than a constant phase, so their phases become more aligned as they expand. This results in progressively higher contrast as distance from the grating increases. Thus, when measuring a surface where more intensity is needed to achieve low image noise, multiple light emitters 81 from the same fringe set can be simultaneously turned on to provide more brightness at high contrast. However, at close distances, the sinusoidal intensities are not phase aligned and fringe set contrast decreases. Also, less intensity is needed at close distances; so when viewing a closer surface, one light emitter 81 can be turned on to achieve adequate intensity and high contrast.

Depending on the evaluation from brightness or fringe contrast determining function 39, one light emitter 81 or multiple light emitters 81 in each light emitter group are enabled for each fringe set. In one embodiment, drive conductor 35 comprises one or more drive wires (not shown) per LED. Brightness or fringe contrast determining function 39 selectively transmits current through specific drive wires of drive conductor 35 to light an appropriate number of LEDs per fringe set.

Alternatively, brightness or fringe contrast determining function 39 can be located separately from emitter drive 32 and may comprise, for example, an analog detection circuit or video processor. With that assembly, one drive wire of drive conductor 35 connects emitter drive 32 to light emitter module 37, and one or more control wires (not shown) controlled by brightness or fringe contrast determining function 39 are also connected to light emitter module 37. A circuit (not shown) included on light emitter module 37 can selectively connect one or multiple LEDs to the drive wire in response to signals on the control wire(s).

Through the use of multiple light emitters 81 per fringe set and brightness or fringe contrast determining function 39, LED array 80 offers adequate brightness and contrast during image capture and measurement. LED array 80 also offers consistent, uniform illumination, no speckling, and fast switching between fringe sets. Fast switching allows fringe set images to be captured in sequential frames, which reduces the likelihood of motion between image capture times. For at least these reasons, LED arrays are practical in this configuration. However, any light emitting source(s) offering the qualities mentioned above are sufficient for use in probe or system 100. Other such light sources include, but are not limited to, organic LEDs, plasma elements, fiber coupled lasers, and laser arrays.

In another embodiment, LED array 80 is made using multiple series LEDs that comprise one light emitter 81 of a light emitter group. A light emitter 81 in this configuration may also be referred to as a string. Each light emitter or string 83 can comprise, e.g., 4 LEDs connected in series. Each light emitter or string 83 can be offset by approximately p/3 periods, where p is an integer that is not a multiple of 3. Each of the plurality of light emitters 81 may comprise a series string of at least two LEDs. For example, three strings can be used comprising four LEDs each, each string comprising its own light emitter group. However, a light emitter group may comprise a plurality of light emitters 81 or strings as well.

LED output is typically proportional to drive current. But, supplying high currents to distally-located LEDs using small wires is highly inefficient. By using multiple LEDs connected in series to comprise one light emitter or string 83, less current is required to achieve a given combined LED output level. For example, series strings of 4 LEDs as shown in FIG. 4 can achieve the same output as single LEDs using $1/4^{th}$ of the current.

FIG. 6 is a top view of an exemplary intensity modulating element including a line grating. This element can be used for performing phase measurements. In at least one embodiment, the at least one intensity modulating element 38 comprises line grating 90. In addition, the at least one light emitter module comprises a plurality of light emitters. The at least one light emitter module can include LEDs or an LED array.

A fringe set comprises a structured-light pattern projected when one light emitter group of at least one of the plurality of light emitters is emitting light. The plurality of light emitters of light emitter module 37 are positioned such that the structured-light pattern projected when one group of at least one light emitter is emitting exhibits a spatial or phase-shift relative to the structured-light patterns projected when other groups of at least one light emitter are emitting. In other words, the structured-light pattern of one fringe set exhibits a spatial or phase-shift relative to the structured-light patterns of other fringe sets.

Figure 7:
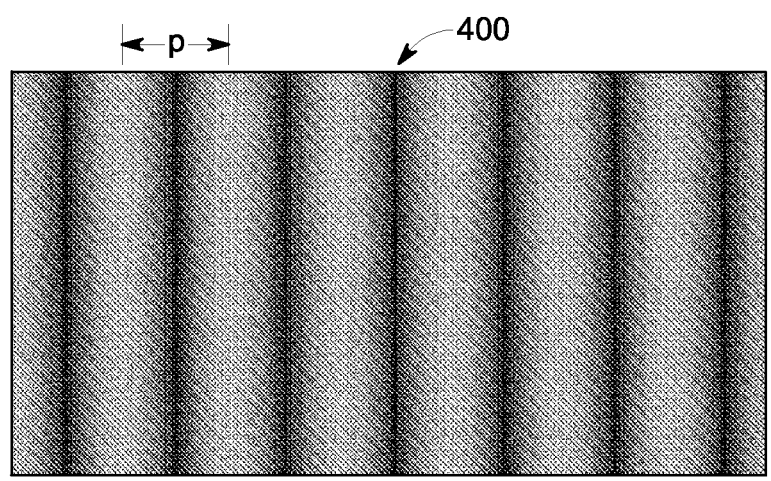
FIG. 7 is an exemplary image of a structured light pattern created by passing light through an intensity modulating element.

FIG. 7 is an exemplary image of a structured light pattern created by passing light through an intensity modulating element. A structured-light pattern 400 is created on the surface of an object in the field of view of the image sensor, e.g., a test object, by passing light through at least one intensity-modulating element 38 (FIG. 1), e.g., line grating 90 (FIG. 6), which alters the distribution of light. The structured-light pattern 400 can comprise parallel light lines and dark lines comprising a sinusoidal intensity profile in the direction perpendicular to the lines (e.g., left to right across FIG. 7). In this example, the centers of the light lines have high luminance values and the centers of the dark lines have low or no luminance. The dark lines of the structured light pattern 400 and the zero luminance values of the sinusoidal intensity profile can be formed by the columns of grating elements in line grating 90. The grating period (p) is shown as the distance from the center of one light line to the center of the next light line. It will be understood that the grating period can be defined to start (and end) at various points along the sinusoidal intensity profile.

In one embodiment, the length of the grating period (p) (e.g., 0.125 mm (0.0049 in.)) of the first sinusoidal pattern on the intensity modulating element can be at least two times the width of the light emitters 81 (FIG. 5) (e.g., 0.05 mm (0.00197 in.)) to provide effective contrast while providing a reasonable number of light and dark lines in the captured images. Reducing the length of the grating period (p) increases the number of light and dark lines and decreases the contrast of the image for a given light emitter 81 width. In one embodiment, the amplitude of the first sinusoidal pattern can be much smaller (e.g., at least five times smaller) than the length of the light emitters 81 so that the amplitude of the individual sinusoids (0.015 mm (0.00118 in.) in the projected pattern is relatively small, minimizing degradation of the sinusoidal intensity profile, but is large enough to achieve good contrast with manufacturable feature sizes (e.g., greater than 0.001 mm (0.0000394 in.)). Higher pattern contrast can provide lower noise than lower pattern contrast. In one embodiment, the intensity modulating elements can have approximately 15 columns and approximately 100 rows of grating elements.

In one embodiment, the substrate of the intensity modulating elements can be made of sapphire for durability. In one embodiment, grating elements are formed by photolithography on the intensity modulating elements using a coating that is highly absorptive of the wavelengths emitted by the light emitters 81 in order to minimize reflections. For example, if the light emitters 81 are emitting a red wavelength, a blue chrome that is highly absorptive (e.g., less than five percent reflectance at 750 nm) of the red wavelength can be used for the grating elements. It will be understood that other coatings and colors can be used to provide high absorption of the wavelengths emitted by the light emitters 81 (e.g., black anodized). In one embodiment, the grating elements can be applied only on the front side (i.e., side of the intensity modulating element facing the light emitters 81), to avoid scratching or damage to the grating elements if located on the exposed back side of the intensity modulating element. In another embodiment, the grating elements can be applied on only the back side of the intensity modulating element, while in yet another embodiment, the grating elements can be applied to both the front side and the back side of the intensity modulating element. In one embodiment, an anti-reflective coating can be applied on top of the grating elements.

It will be understood that grating elements with non-sinusoidal patterns that approximate a sinusoidal pattern (e.g., a triangle pattern, a hexagon pattern) can also be used to produce a near sinusoidal intensity profile that can be compensated for during phase-shift analysis by the software.

Figure 8A:
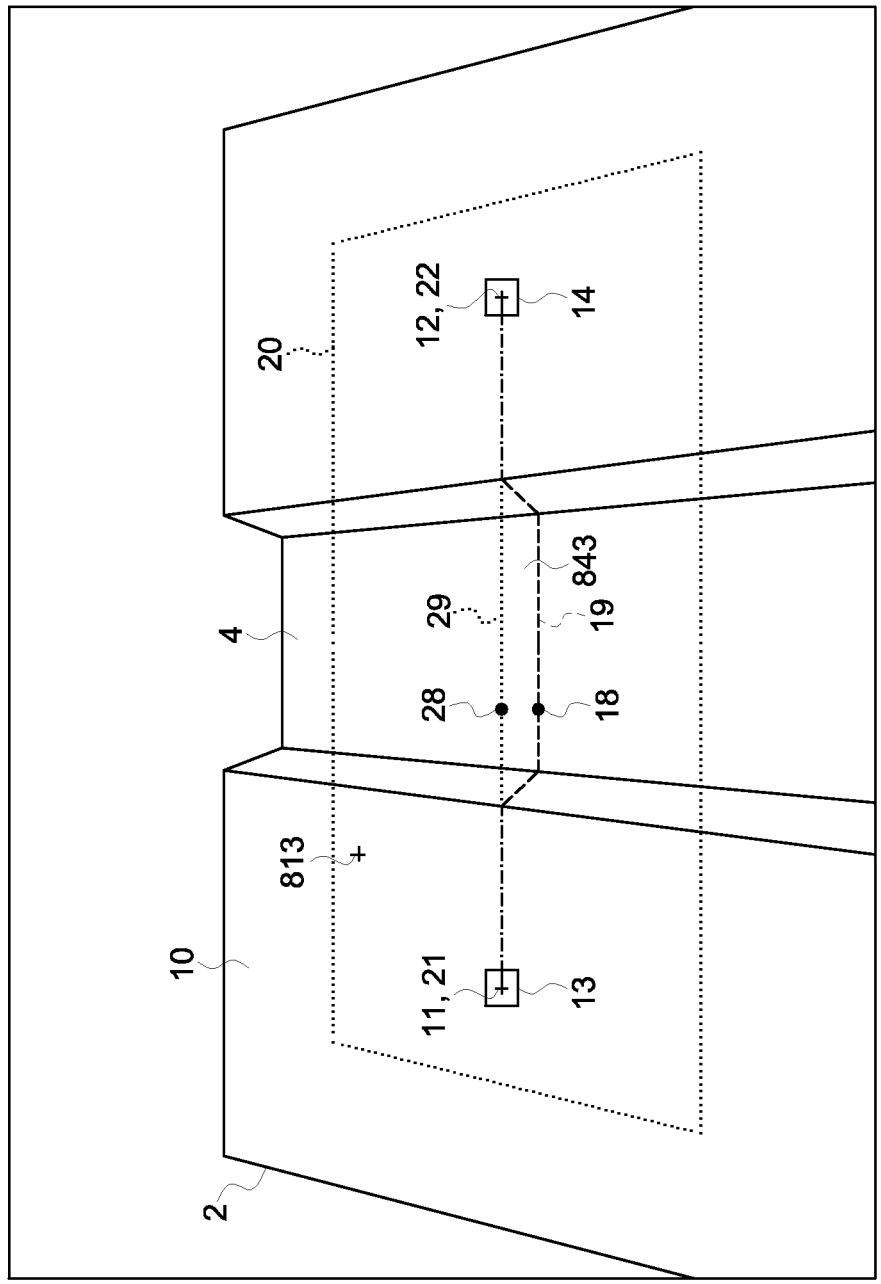
FIG. 8A is a perspective of an exemplary test feature.

FIG. 8A is a perspective, and FIG. 8B a perspective and cross-section, of an exemplary test feature. In this example, the test feature 4 is a groove in a test object 2. The known geometric characteristic is distance 810, which is the depth of the test feature 4. The measured geometric characteristic is the distance 820 between point 15 and reference surface 20. In an ideal (perfectly-manufactured) system, distances 810 and 820 are equal. Differences between distance 810 and distance 820 beyond manufacturing tolerances can indicate the condition of the measurement system. The location and orientation of point 15 and reference surface 20 are measured from the coordinates determined from the image data. In this example, the coordinates are three-dimensional.

First surface point 11 (e.g., a start surface point), second surface point 12 (e.g., a stop surface point), and third surface point 813 are automatically selected on the surface 10 of the test object 2. Automatic selection can be part of step 350 (FIG. 3). The automatic selection can be performed, e.g., by locating three fiducials in the image data and selecting coordinates (from step 340, FIG. 3) from each as the three points 11, 12, 813. In one embodiment, the first surface point 11 can be selected on one side (e.g. the left side) of the test feature 4 to be measured, while the second surface point 12 can be selected on the other side (e.g., the right side) of the test feature 4 to be measured.

Continuing step 350 (FIG. 3), in these embodiments reference surface 20 is determined based on the three-dimensional coordinates of the first surface point 11 and the second surface point 12. In this example, the reference surface 20 is flat, while in other embodiments the reference surface 20 can be curved. Similarly, in one embodiment, the reference surface 20 can be in the form of a plane, while in other embodiments, the reference surface 20 can be in the form of a different shape (e.g., cylinder, sphere, etc.). The controller can perform a surface fitting of the three-dimensional coordinates of the first surface point 11, the second surface point 12, and the third surface point 813 to determine a reference surface equation (e.g., for a plane) having the following form:

$$k_{0RS} + k_{1RS} \cdot x_{iRS} + k_{2RS} \cdot y_{iRS} = z_{iRS} \tag{13}$$

where ($x_{iRS}$, $y_{iRS}$, $z_{iRS}$) are the coordinates of the surface points and $k_{0RS}$, $k_{1RS}$, and $k_{2RS}$ are coefficients obtained by a curve fitting of the three-dimensional coordinates. More than three points can be used. For example, the reference surface 20 can be based on, e.g., determined by surface-fitting to, the three-dimensional coordinates of a first plurality 13 of points on the surface 10 ($x_{iASP}$, $y_{iASP}$, $z_{iASP}$) and the three-dimensional coordinates of a second plurality 14 of points on the surface 10 ($x_{iBSP}$, $y_{iBSP}$, $z_{iBSP}$), and optionally at least one other point spaced apart from pluralities 13, 14.

It should be noted that a plurality of points (i.e., at least as many points as the number of k coefficients) are used to perform the fitting. The fitting finds the k coefficients that give the best fit to the points used (e.g., least squares approach). The k coefficients then define the plane or other reference surface 20 that approximates the three-dimensional points used. However, when you insert the x and y coordinates of the points used into the plane equation (13), the z results will generally not exactly match the z coordinates of the points due to noise and any deviation from a plane that may actually exist. Thus, the $x_{iRS}$ and $y_{iRS}$ can be any arbitrary values, and the resulting $z_{iRS}$ tells you the z of the defined plane at $x_{iRS}$, $y_{iRS}$. Accordingly, coordinates shown in these equations can be for arbitrary points exactly on the defined surface, not necessarily the points used in the fitting to determine the k coefficients.

In various embodiments, the controller can determine the three-dimensional coordinates of a first reference surface point 21 on the reference surface 20 corresponding to the first surface point 11 on the surface 10 and a second reference surface point 22 on the reference surface 20 corresponding to the second reference surface point 12 on the surface 10. In some circumstances, the three-dimensional coordinates of the first reference surface point 21 and the first surface point 11 can be the same. Similarly, the three-dimensional coordinates of the second reference surface point 22 and the second surface point 12 can be the same. However, in some circumstances, due to noise or small variations in the surface 10, the first surface point 11 and the second surface point 12 do not fall exactly on the reference surface 20, and therefore have different coordinates.

When determining points on the reference surface 20 that correspond to points on the surface 10, it is convenient to apply the concept of line directions, which convey the relative slopes of lines in the x, y, and z planes, and can be used to establish perpendicular or parallel lines. For a given line passing through two three-dimensional coordinates (x0, y0, z0) and (x1, y1, z1), the line directions (dx, dy, dz) may be defined as:

$$dx = x1 - x0 \tag{14}$$

$$dy = y1 - y0 \tag{15}$$

$$dz = z1 - z0 \tag{16}$$

Given a point on a line (x0, y0, z0) and the line's directions (dx, dy, dz), the line can be defined by:

$$\frac{(x - x0)}{dx} = \frac{(y - y0)}{dy} \tag{17}$$
$$= \frac{(z - z0)}{dz}$$

Thus, given any one of an x, y, or z coordinate, the remaining two can be computed. Parallel lines have the same or linearly scaled line directions. Two lines having directions (dx0, dy0, dz0) and (dx1, dy1, dz1) are perpendicular if:

$$dx0 \cdot dx1 + dy0 \cdot dy1 + dz0 \cdot dz1 = 0 \tag{18}$$

The directions for all lines normal to a reference plane defined using equation (13) are given by:

$$dx_{RSN} = -k_{1RS} \tag{19}$$

$$dy_{RSN} = -k_{2RS} \tag{20}$$

$$dz_{RSN} = 1 \tag{21}$$

Based on equations (17) and (19) through (21), a line that is perpendicular to a reference surface 20 and passing through a surface point ($x_S$, $y_S$, $z_S$) can be defined as:

$$\frac{x - x_S}{-k_{1RS}} = \frac{y - y_S}{-k_{2RS}} \tag{22}$$
$$= z - z_S$$

In one embodiment, the coordinates of a point on the reference surface 20 ($x_{iRS}$, $y_{iRS}$, $z_{iRS}$) that corresponds to a point on the surface 10 ($x_{iS}$, $y_{iS}$, $z_{iS}$) (e.g. three-dimensional coordinates a first reference surface point 21 on the reference surface 20 corresponding to the first surface point 11 on the surface 10), can be determined by defining a line normal to the reference plane having directions given in (19)-(21) and passing through ($x_{iS}$, $y_{iS}$, $z_{iS}$), and determining the coordinates of the intersection of that line with the reference plane. Thus, from equations (13) and (22):

$$z_{iRS} = \frac{(k_{1RS}^2 \cdot z_{iS} + k_{1RS} \cdot x_{iS} + k_{2RS}^2 \cdot z_{iS} + k_{2RS} \cdot y_{iS} + k_{ORS})}{(1 + k_{1RS}^2 + k_{2RS}^2)} \tag{23}$$

$$x_{iRS} = k_{1RS} \cdot (z_{iS} - z_{iRS}) + x_{iS} \tag{24}$$

$$y_{iRS} = k_{2RS} \cdot (z_{iS} - z_{iRS}) + y_{iS} \tag{25}$$

In one embodiment, these steps (equations (14) through (25)) can be used to determine the three-dimensional coordinates of a first reference surface point 21 ($x_{ARS}$, $y_{ARS}$, $z_{ARS}$) on the reference surface 20 corresponding to the first surface point 11 ($x_{AS}$, $y_{AS}$, $z_{AS}$) on the surface 10 and a second reference surface point 22 ($x_{BRS}$, $y_{BRS}$, $z_{BRS}$) on the reference surface 20 corresponding to the second reference surface point 12 ($x_{BS}$, $y_{BS}$, $z_{BS}$) on the surface 10.

The controller can also determine the three-dimensional coordinates of a reference surface line 29 on the reference surface 20 from the first reference surface point 21 to the second reference surface point 22. There are several methods of determining the three-dimensional coordinates of a reference surface line 29. In one embodiment where the reference surface 20 is a plane, the three-dimensional coordinates of a reference surface line point 28 ($x_{RSL}$, $y_{RSL}$, $z_{RSL}$) on the reference surface line 29 can be determined based on the three-dimensional coordinates of the first reference surface point 21 ($x_{ARS}$, $y_{ARS}$, $z_{ARS}$) and the second reference surface point 22 ($x_{BRS}$, $y_{BRS}$, $z_{BRS}$) using the following relationship, where knowledge of one of the coordinates of the reference surface line point 28 ($x_{RSL}$ or $y_{RSL}$ or $z_{RSL}$) can be used to determine the other two:

$$\frac{x_{RSL} - x_{ARS}}{x_{BRS} - x_{ARS}} = \frac{y_{RSL} - y_{ARS}}{y_{BRS} - y_{ARS}} \quad (26)$$
$$= \frac{z_{RSL} - z_{ARS}}{z_{BRS} - z_{ARS}}$$

Once the three-dimensional coordinates of the reference surface line points 28 ($x_{iRSL}$, $y_{iRSL}$, $z_{iRSL}$) on reference surface line 29 are determined, the controller can determine the three-dimensional coordinates of a surface contour 19 that is the projection of the reference surface line 29 onto the surface 10 of the test object 2, perpendicular to the reference surface 29. as shown, the surface contour 19 is not necessarily a straight line. Reference surface line 29 and surface contour 19 can extend between two of the points used to determine reference surface 20, or one of those points and another point on reference surface 20, or two other points on reference surface 20.

The controller can determine the distance of lines 26 from the reference surface line 29 to a plurality of reference surface points 25 ($x_{iRS}$, $y_{iRS}$, $z_{iRS}$) on the reference surface 20 where surface-to-reference surface lines 16 extending from a plurality of surface points 15 ($x_{iS}$, $y_{iS}$, $z_{iS}$) on the surface 10 are perpendicular to the reference surface 20 and intersect the reference surface 20. The controller can automatically select the surface points 15 from the 3-D coordinates determined in step 340. For example, the test feature 4 can be identified by a fiducial, and the controller can select points within a predetermined distance of the fiducial as surface points 15. Alternatively, having determined reference surface 20, the controller can select as surface points 15 points that are more than a preselected distance from reference surface 20. The predetermined distance or the preselected distance can be included in the known geometric characteristic.

In one embodiment, for each of the plurality of surface points 15 ($x_{iS}$, $y_{iS}$, $z_{iS}$), equations (14) through (25) can be used to determine the three-dimensional coordinates of the reference surface points 25 ($x_{iRS}$, $y_{iRS}$, $z_{iRS}$) on the reference surface 20 corresponding to the surface points 15 ($x_{iS}$, $y_{iS}$, $z_{iS}$) on the surface 10 (e.g., for each, the reference surface point 25 where a surface-to-reference surface line 16 extending from the surface points 15 is perpendicular to the reference surface 20 and intersects the reference surface 20. The length of surface-to-reference-surface line 16 is distance 820, which is the measured geometric characteristic.

In one embodiment, once the three-dimensional coordinates of the reference surface points 25 ($x_{iRS}$, $y_{iRS}$, $z_{iRS}$) are determined, the controller can determine the distances of lines 26 extending in the reference surface 20 from the reference surface points 25 that are perpendicular to the reference surface line 29 and intersect the reference surface line 29 at reference surface line intersection points 27 ($x_{iRSLI}$, $y_{iRSLI}$, $z_{iRSLI}$). The three-dimensional coordinates of the reference surface line intersection points 27 can be determined by the following steps:

$$dx = x_{BRS} - x_{ARS} \quad (27)$$

$$dy = y_{BRS} - y_{ARS} \quad (28)$$

$$dz = z_{BRS} - z_{ARS} \quad (29)$$

$$z_{iRSLI} = \frac{(dx \cdot (dz \cdot (x_{iRS} - x_{BRS}) + dx \cdot z_{BRS}) + dy \cdot (dz \cdot (y_{iRS} - y_{BRS}) + dy \cdot z_{BRS}) + dz \cdot dz \cdot z_{iRS})}{(dx^2 + dy^2 + dz^2)} \quad (30)$$

$$y_{iRLSI} = \frac{dy \cdot (z_{iRLSI} - z_{BRS})}{dz + y_{BRS}} \quad (31)$$

$$x_{iRLSI} = \frac{dx \cdot (y_{iRLSI} - y_{BRS})}{dy + x_{BRS}} \quad (32)$$

In one embodiment, once the three-dimensional coordinates of the reference surface point intersection points 27 ($x_{iRSLI}$, $y_{iRSLI}$, $z_{iRSLI}$) corresponding to reference surface points 25 ($x_{iRS}$, $y_{iRS}$, $z_{iRS}$) are determined, the distance ($d_{26}$) of the line 26 between those points can be determined using the following:

$$d_{i26} = \sqrt{(x_{iRS} - x_{iRSLI})^2 + (y_{iRS} - y_{iRSLI})^2 + (z_{iRS} - z_{iRSLI})^2} \quad (33)$$

In one embodiment, this form of equation (33) can be used to determine the distance of a line between any two points on the reference surface 20 whose coordinates (x, y, z) are known (e.g., the distance ($d_{16}$) of surface-to-reference surface line 16 from a surface point 15 to a reference surface point 25, the distance ($d_{23}$) of the line 23 from a reference surface point intersection point 27 to the first reference surface point 21, etc.).

The controller can determine the three-dimensional coordinates of a surface contour 19 on the surface 10 from the first reference surface point 21 to the second reference surface point 22 based on the surface points 15 whose perpendicular surface-to-reference surface lines 16 intersect the reference surface 20 on, or within a predetermined distance from, the reference surface line 29. For example, if the distance of line 26 for a particular reference surface point 25 is greater than a threshold value, that is an indication that the surface point 15 ($x_S$, $y_S$, $z_S$) corresponding to that reference surface point 25 is far from the desired surface contour 19 that is the projection of the reference surface line 29 onto the surface 10 of the test object 2, perpendicular to the reference surface 29. On the other hand, if the distance of the line 26 for a particular reference surface point 25 is zero or less than a threshold value, that is an indication that the surface point 15 ($x_S$, $y_S$, $z_S$) is on or near the desired surface contour 19 that is the projection of the reference surface line 29 onto the surface 10 of the test object 2, perpendicular to the reference surface 29.

In one embodiment, the controller can select from the surface points 15 the set of surface contour points 18 ($x_{iSCL}$, $y_{iSCL}$, $z_{iSCL}$) whose corresponding reference surface points 25 have lines 26 with distances (($d_{26}$) given by equation (33)) that are less than a threshold value that can form the surface contour 19. The controller can display an overlay on the image of the surface 10 indicating the location of the surface contour 19 on the surface.

The controller can determine the profile of the surface 10 of the test object 2 by determining the distance (e.g., the perpendicular distance) from the reference surface 20 to the surface contour 19 from the first reference surface point 21 ($x_{ARS}$, $y_{ARS}$, $z_{ARS}$) to the second reference surface point 22 ($x_{BRS}$, $y_{BRS}$, $z_{BRS}$). In one embodiment, the controller can automatically determine and display the area of a space 843 between the reference surface 20 and the surface contour 19. The area can be determined by dividing the space 843 between the reference surface line 29 and the surface contour 19 into a plurality of polygons, such as rectangles, and summing the areas of those polygons. The controller can also automatically determine and display the distance from the reference surface 20 to the point on the surface contour 19 that is the furthest from the reference surface 20 to indicate the deepest or highest point in the test feature 4. In one embodiment, the distance or area between the reference surface 20 and the surface contour 19 can be the distance or area between the reference surface line 29 and the surface contour 19.

In one embodiment, the controller can display a graphical representation (not shown) of the profile of the surface 10 comprising a cross-section of the test object 2 at the surface contour 19 from the first reference surface point 21 to the second reference surface point 22. The reference surface line 29 may not be shown in some embodiments. The graphical representation can also have a scale indicating the distance from the reference surface 20 to the surface contour 19. This graphical representation can also be accompanied by a thumbnail of the image of the surface 10 of the test object 2, also showing the reference surface line 29.

Returning to FIG. 6, in one embodiment, the graphical representation of the profile of the surface 10 can include a plot of the distances from the surface contour points 18 on the surface contour 19 to the reference surface 20. In one embodiment, the reference surface line 29 can be divided into equally spaced reference surface line points 28, each corresponding to an x-value of the graphical representation. For each reference surface line point 28, the distance from the surface contour 19 to the reference surface 20 can be determined by selecting the surface contour points 18 whose corresponding reference surface points 25 are within a certain threshold distance from the reference surface line point 28, and determining the weighted average of the distance from those selected surface contour points 18 to the reference surface line point 28. The weight assigned to the distance of each selected surface contour points 18 can be inversely proportional to the distance from the reference surface point 25 corresponding to that surface contour point 18 to the reference surface line point 28 (i.e., the smaller the distance, the greater the weight).

In various embodiments, the three-dimensional coordinates of at least three surface points 11, 12, 813 can be used to determine the reference surface 20 (e.g., a plane). In one embodiment and for improved accuracy, the controller can use the three-dimensional coordinates of all of the surface points on test object 2 to determine the reference surface 20. Moreover, three-dimensional coordinates of at least three other surface points can be used to determine a second reference surface (e.g., a plane) for a second portion of test object 2. Any number of planes or reference surfaces can be determined for a given test feature 4, or for multiple test features on test object 2. The known geometric characteristic can include data indicating how many reference surfaces to fit, where to position those surfaces with respect to fiducials or other features of the test object, and for using in computing which measured geometric characteristics.

Figure 9:
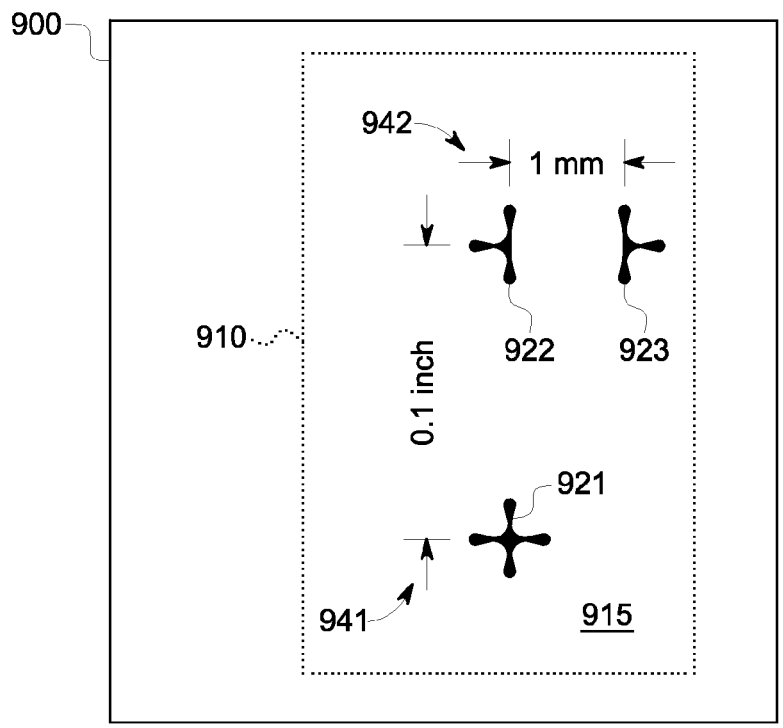
FIG. 9 is a plan view of an exemplary test feature.

FIG. 9 is a plan view of an exemplary test feature. Test feature 910 is a substantially planar surface of test object 900, marked with or otherwise carrying at least two fiducials 921, 922. Fiducials 921, 922 are arranged to be detectable by an image sensor in the probe. For example, if the image sensor is adapted to detect visible light, fiducials 921, 922 are formed to reflect or absorb visible light differently than surround 915. The controller can detect the fiducials in the image by image-processing techniques that differentiate fiducials 921, 922, 923 (e.g., black ink) from surround 915 (e.g., a white surface) as discussed above. The test feature can have a matte or glossy surface, or a combination. In an example, fiducials 921, 922, 923 and surround 915 have a matte finish.

In various embodiments, test feature 910 further includes third fiducial 923, also formed to be detectable by an image sensor in the probe. Fiducials 921, 922, 923 can have the same shape, or different shapes, or two can have the same shape and one can have a different shape. The fiducials can be distinguishable from each other by the way they are arranged. In this example, they are arranged so that the three pairwise distances between them are different. The fiducials can also be distinguishable from each other by their shapes, colors, or other properties that are detectable by the image sensor or that can be determined by processing data from the image sensor. In this example, fiducial 921 is distinguishable from fiducials 922 and 923 by shape, and fiducials 922 and 923 are distinguishable from each other by their respective separations from fiducial 921. Whether or not the fiducials are distinguishable, measuring step 350 (FIG. 3) can include determining a first distance 931 between the first fiducial 921 and the second fiducial 922, and a second distance 932 between the second fiducial 922 and the third fiducial 923. If the fiducials are not distinguishable (e.g., are at the corners of an equilateral triangle and are identical), the choice of which fiducial is first, second, and third can be made arbitrarily or using a random- or pseudorandom-number generator.

In this example, test feature 910 also includes labels 941, 942 indicating to a human (or a computer with optical character recognition technology) the first distance between fiducials 921 and 922, and the second distance between fiducials 922 and 923, respectively. These labels provide a sense of scale, e.g., when the user is viewing a guide image (step 325, FIG. 3). In various embodiments, labels 941, 942 can include machine-readable information, e.g., barcodes representing the serial number of test object 900, the first and second distances, or other information.

FIG. 4 is a high-level diagram showing the components of an exemplary data-processing system for analyzing data and performing other analyses described herein. The system includes a data processing system 1110, a peripheral system 1120, a user interface system 1130, and a data storage system 1140. The peripheral system 1120, the user interface system 1130 and the data storage system 1140 are communicatively connected to the data processing system 1110. Data processing system 1110 can be communicatively connected to network 1150, e.g., the Internet or an X.25 network, as discussed below. A controller carrying out operations described above (e.g., in FIG. 3) can include one or more of systems 1110, 1120, 1130, or 1140, and can connect to one or more networks(s) 1150. For example, microcontroller 30, CPU 56, or video processor(s) 50 (all FIG. 1) can each include system 1110 and one or more of systems 1120, 1130, or 1140.

The data processing system 1110 includes one or more data processor(s) that implement processes of various embodiments described herein. A "data processor" is a device for automatically operating on data and can include a central processing unit (CPU), a desktop computer, a laptop computer, a mainframe computer, a personal digital assistant, a digital camera, a cellular phone, a smartphone, or any other device for processing data, managing data, or handling data, whether implemented with electrical, magnetic, optical, biological components, or otherwise.

The phrase "communicatively connected" includes any type of connection, wired or wireless, between devices, data processors, or programs in which data can be communicated. Subsystems such as peripheral system 1120, user interface system 1130, and data storage system 1140 are shown separately from the data processing system 1110 but can be stored completely or partially within the data processing system 1110.

The data storage system 1140 includes or is communicatively connected with one or more tangible non-transitory computer-readable storage medium(s) configured to store information, including the information needed to execute processes according to various embodiments. A "tangible non-transitory computer-readable storage medium" as used herein refers to any non-transitory device or article of manufacture that participates in storing instructions which may be provided to data processing system 1110 for execution. Such a non-transitory medium can be non-volatile or volatile. Examples of non-volatile media include floppy disks, flexible disks, or other portable computer diskettes, hard disks, magnetic tape or other magnetic media, Compact Discs and compact-disc read-only memory (CD-ROM), DVDs, BLU-RAY disks, HD-DVD disks, other optical storage media, Flash memories, read-only memories (ROM), and erasable programmable read-only memories (EPROM or EEPROM). Examples of volatile media include dynamic memory, such as registers and random access memories (RAM). Storage media can store data electronically, magnetically, optically, chemically, mechanically, or otherwise, and can include electronic, magnetic, optical, electromagnetic, infrared, or semiconductor components.

Embodiments of the present invention can take the form of a computer program product embodied in one or more tangible non-transitory computer readable medium(s) having computer readable program code embodied thereon. Such medium(s) can be manufactured as is conventional for such articles, e.g., by pressing a CD-ROM. The program embodied in the medium(s) includes computer program instructions that can direct data processing system 1110 to perform a particular series of operational steps when loaded, thereby implementing functions or acts specified herein.

In an example, data storage system 1140 includes code memory 1141, e.g., a random-access memory, and disk 1142, e.g., a tangible computer-readable storage device such as a hard drive or solid-state flash drive. Computer program instructions are read into code memory 1141 from disk 1142, or a wireless, wired, optical fiber, or other connection. Data processing system 1110 then executes one or more sequences of the computer program instructions loaded into code memory 1141, as a result performing process steps described herein. In this way, data processing system 1110 carries out a computer implemented process that provides for a technical effect of measuring geometric characteristics of the test feature and determining the physical condition of a remote visual inspection system. This condition (accurate or not) can then be reported to a user. In various embodiments, blocks of the flowchart illustrations or block diagrams herein, and combinations of those, can be implemented by computer program instructions.

Computer program code can be written in any combination of one or more programming languages, e.g., Java, Smalltalk, C++, C, or an appropriate assembly language. Program code to carry out methods described herein can execute entirely on a single data processing system 1110 or on multiple communicatively-connected data processing systems 1110. For example, code can execute wholly or partly on a user's computer and wholly or partly on a remote computer, e.g., a server. The remote computer can be connected to the user's computer through network 1150. The user's computer or the remote computer can be non-portable computers, such as conventional desktop personal computers (PCs), or can be portable computers such as tablets, cellular telephones, smartphones, or laptops.

The peripheral system 1120 can include one or more devices configured to provide digital content records or other data to the data processing system 1110. For example, the peripheral system 1120 can include digital still cameras, digital video cameras, cellular phones, or other data processors. The data processing system 1110, upon receipt of data from a device in the peripheral system 1120, can store such data in the data storage system 1140.

The user interface system 1130 can include a mouse, a keyboard, another computer (connected, e.g., via a network or a null-modem cable), a microphone and speech processor or other device(s) for receiving voice commands, a camera and image processor or other device(s) for receiving visual commands, e.g., gestures, or any device or combination of devices from which data is input to the data processing system 1110. In this regard, although the peripheral system 1120 is shown separately from the user interface system 1130, the peripheral system 1120 can be included as part of the user interface system 1130.

The user interface system 1130 also can include a display device, a processor-accessible memory, or any device or combination of devices to which data is output by the data processing system 1110. In this regard, if the user interface system 1130 includes a processor-accessible memory, such memory can be part of the data storage system 1140 even though the user interface system 1130 and the data storage system 1140 are shown separately in FIG. 4.

In various embodiments, data processing system 1110 includes communication interface 1115 that is coupled via network link 1116 to network 1150. For example, communication interface 1115 can be an integrated services digital network (ISDN) card or a modem to provide a data communication connection to a corresponding type of telephone line. As another example, communication interface 1115 can be a network card to provide a data communication connection to a compatible local-area network (LAN), e.g., an Ethernet LAN, or wide-area network (WAN). Wireless links, e.g., WiFi or GSM, can also be used. Communication interface 1115 sends and receives electrical, electromagnetic or optical signals that carry digital data streams representing various types of information across network link 1116 to network 1150. Network link 1116 can be connected to network 1150 via a switch, gateway, hub, router, or other networking device.

Network link 1116 can provide data communication through one or more networks to other data devices. For example, network link 1116 can provide a connection through a local network to a host computer or to data equipment operated by an Internet Service Provider (ISP).

Data processing system 1110 can send messages and receive data, including program code, through network 1150, network link 1116 and communication interface 1115. For example, a server can store requested code for an application program (e.g., a JAVA applet) on a tangible non-volatile computer-readable storage medium to which it is connected. The server can retrieve the code from the medium and transmit it through the Internet, thence a local ISP, thence a local network, thence communication interface 1115. The received code can be executed by data processing system 1110 as it is received, or stored in data storage system 1140 for later execution.

In view of the foregoing, various embodiments of the invention image the test feature and process the images to determine whether a remote visual inspection system is operating within acceptable accuracy limits. A technical effect is to permit determining that a remote visual system should be used, or that it should not be used, or that it is in need of repair or recalibration.

The invention is inclusive of combinations of the aspects or embodiments described herein. References to "a particular aspect" or "embodiment" and the like refer to features that are present in at least one aspect of the invention. Separate references to "an aspect" or "particular aspects" or "embodiments" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention. Examples of variations, combinations, and modifications that are intended to be within the scope of the claims are those having structural elements that do not differ from the literal language of the claims and those including equivalent structural elements with insubstantial differences from the literal language of the claims.

What is claimed is:

1. A method of testing measurement accuracy of a remote visual inspection system, the testing using a test object including a test feature having a known geometric characteristic, the method comprising automatically performing the following steps using a controller:
    detecting attachment of a detachable measurement optical tip to a probe of the remote visual inspection system;
    after detecting attachment of the detachable measurement optical tip, prompting a user via a user-prompt device to perform testing of the measurement accuracy of the remote visual inspection system;
    capturing one or more images of the test feature on the test object;
    determining coordinates of the test feature using at least some of the captured images;
    determining a measured geometric characteristic of the test feature using the determined coordinates of the test feature;
    determining an accuracy result using the measured geometric characteristic and the known geometric characteristic; and
    providing an indication of the determined accuracy result.

2. The method according to claim 1, wherein the determining-accuracy-result step includes computing the accuracy result as a difference between the measured geometric characteristic and the known geometric characteristic of the test feature.

3. The method according to claim 1, wherein the determining-accuracy-result step includes:
    determining an accuracy value based on a difference between the measured geometric characteristic and the known geometric characteristic of the test feature;
    comparing the accuracy value to a predetermined acceptable accuracy value; and
    providing a result of the comparison as the accuracy result.

4. The method according to claim 1, wherein the detecting step includes applying a test voltage to a detection circuit and measuring a voltage of a test point in the detection circuit, wherein the detection circuit is configured so that the voltage of the test point is different when the detachable measurement optical tip is attached than when the detachable measurement optical tip is not attached.

5. The method according to claim 1, wherein the probe includes an image sensor and the detachable measurement optical tip is a structured-light-measurement optical tip, a stereo optical tip, or a shadow optical tip.

6. The method according to claim 5, wherein the detachable measurement optical tip includes a plurality of light-emitting-diodes (LEDs) and is adapted to project a structured light pattern onto an object in the field of view of the image sensor when the controller activates any of the LEDs.

7. The method according to claim 1, wherein the prompting step includes waiting for a test-start indication from a user-input device.

8. The method according to claim 1, wherein the user-prompt device is a screen.

9. The method according to claim 8, wherein the prompting step includes:
    presenting on the screen a motion image from an image sensor in the probe; and
    presenting on the screen a visual representation of an image from an image sensor in a desired orientation with respect to the test feature.

10. The method according to claim 9, further including determining an identity of the attached measurement optical tip and selecting the visual representation using the determined identity.

11. The method according to claim 1, wherein the measured geometric characteristic is a length, width, height, depth, radius, or deviation from flat plane or other reference surface, of the test feature, and wherein the test feature includes a flat surface, a sphere or other raised three-dimensional (3-D) surface, or a slot, circular recess, or other recessed 3-D surface.

12. The method according to claim 1, wherein the determined coordinates are three-dimensional (3-D) coordinates, the known geometric characteristic includes 3-D coordinates of a plurality of reference points, and the measured geometric characteristic is a distance metric between the determined coordinates and the reference points.

13. The method according to claim 12, wherein the distance metric is a quadratic mean, sum of squares, mean of squares, or average of respective distances between at least some of the determined coordinates and corresponding ones of the reference points.

14. The method according to claim 1, wherein the determining-measured-geometric-characteristic step includes providing one or more value(s) representative of the measured geometric characteristic; the known geometric characteristic includes one or more predetermined value(s) representative of the test feature; and the determining-accuracy step includes computing difference(s) between the one or more value(s) representative of the measured geometric characteristic and the one or more predetermined value(s) of the known geometric characteristic.

15. The method according to claim 14, wherein the comparing step includes determining whether the computed difference(s) are less than the predetermined acceptable accuracy value.

16. The method according to claim 1, wherein the providing-indication step includes presenting to a user, via a user-output device, a visual, audible, or haptic indication of the result of the comparison.

17. The method according to claim 1, wherein the test feature includes first, second, and third fiducials arranged to be detectable by an image sensor in the probe, and the determining-measured-geometric-characteristic step includes determining a first distance between the first fiducial and the second fiducial, and a second distance between the second fiducial and the third fiducial.

18. The method according to claim 1, further including automatically retrieving calibration data corresponding to the attached measurement optical tip, wherein the measuring step is performed using the retrieved calibration data.

19. The method according to claim 1, further including:
   determining an identity of the attached measurement optical tip;
   storing the determined identity and the determined accuracy result; and
   repeating the detecting-attachment, user-prompting, image-capturing, coordinate-determining, characteristic-determining, accuracy-result-determining, identity-determining, and storing steps a plurality of times.

20. A remote visual inspection system comprising:
   a probe adapted to receive a detachable measurement optical tip, the probe including an image sensor adapted to view a target through the detachable measurement optical tip and capture one or more image(s) of the target;
   a user-prompt device;
   a detection circuit adapted to detect attachment of the detachable measurement optical tip to the probe; and
   a controller responsive to detection of an attachment by the detection circuit to:
      prompt a user via the user-prompt device to place a test object in a selected orientation with respect to the image sensor, the test object including a test feature having a known geometric characteristic;
      operate the image sensor to capture one or more images of the test feature;
      determine coordinates of the test feature using at least some of the captured images;
      determine a measured geometric characteristic of the test feature using the determined coordinates of the test feature;
      determine an accuracy result using the measured geometric characteristic and the known geometric characteristic; and
      provide an indication of the determined accuracy result.

* * * * *